United States Patent
Kwon et al.

(10) Patent No.: US 11,206,561 B2
(45) Date of Patent: Dec. 21, 2021

(54) ANALYSIS METHOD OF VEHICLE-TO-OBJECT COMMUNICATION SYSTEM AND ANALYSIS SYSTEM USING THE SAME

(71) Applicant: WAYTIES, INC., Seoul (KR)

(72) Inventors: Soon Il Kwon, Seongnam-si (KR); Hong Jong Jeong, Yongin-si (KR)

(73) Assignee: WAYTIES, INC., Seoul (KR)

( * ) Notice: Subject to any disclaimer, the term of this patent is extended or adjusted under 35 U.S.C. 154(b) by 0 days.

(21) Appl. No.: 16/499,629

(22) PCT Filed: Mar. 28, 2018

(86) PCT No.: PCT/KR2018/003671
§ 371 (c)(1),
(2) Date: Sep. 30, 2019

(87) PCT Pub. No.: WO2018/182315
PCT Pub. Date: Oct. 4, 2018

(65) Prior Publication Data
US 2020/0045568 A1    Feb. 6, 2020

(30) Foreign Application Priority Data

Mar. 30, 2017 (KR) .................. 10-2017-0040650
Apr. 3, 2017 (KR) .................. 10-2017-0043242
(Continued)

(51) Int. Cl.
*H04W 24/08* (2009.01)
*H04W 4/40* (2018.01)
(Continued)

(52) U.S. Cl.
CPC ............ *H04W 24/08* (2013.01); *H04W 4/40* (2018.02); *H04B 17/318* (2015.01); *H04W 4/021* (2013.01)

(58) Field of Classification Search
CPC ...... H04B 17/318; H04W 4/021; H04W 4/40; H04W 16/18; H04W 24/08; H04W 80/00; H04W 76/14
See application file for complete search history.

(56) References Cited

U.S. PATENT DOCUMENTS

2012/0016581 A1 *   1/2012   Mochizuki ............. G08G 1/161
                                                          701/301
2014/0160941 A1     6/2014   Hui et al.
(Continued)

FOREIGN PATENT DOCUMENTS

KR          10-1506598 B1      3/2015

OTHER PUBLICATIONS

Shin, Min Sub et al., "Data Collection and Monitoring for Measuring the Performance of the Communication Module V2X", Proceedings of the 2016 Korean Institute of Communications and Information Sciences (KICS) Summer Conference (vol. 60), Jul. 2016, pp. 68-69, vol. 60.
(Continued)

*Primary Examiner* — Khoa Huynh
(74) *Attorney, Agent, or Firm* — Novick, Kim & Lee, PLLC; Sang Ho Lee; Hyun Woo Shin

(57) ABSTRACT

Provided is an analysis method for testing a vehicle-to-object (V2X) communication system and a system for performing the analysis method. The analysis method for a vehicle-to-object (V2X) communication system includes the steps of collecting data on a radio signal from the V2X communication system, the radio signal being transmitted or received in the V2X communication system; and transferring at least a portion of the collected radio signal data to a client; wherein the radio signal data is collected from two or more layers of layers constructing the V2X communication system.

17 Claims, 28 Drawing Sheets

(30) Foreign Application Priority Data

Apr. 3, 2017 (KR) ........................ 10-2017-0043262
Apr. 4, 2017 (KR) ........................ 10-2017-0043656

(51) Int. Cl.
*H04B 17/318* (2015.01)
*H04W 4/021* (2018.01)

(56) References Cited

U.S. PATENT DOCUMENTS

| | | | |
|---|---|---|---|
| 2016/0119799 A1* | 4/2016 | Hutchins | B61L 15/0081 |
| | | | 455/67.7 |
| 2016/0338118 A1 | 11/2016 | Vajapeyam et al. | |
| 2017/0032402 A1 | 2/2017 | Patsiokas et al. | |
| 2020/0015298 A1* | 1/2020 | Chae | H04B 7/0632 |

OTHER PUBLICATIONS

Catt." Discussions on Performance Metrics for PC5 V2V", R1-153954, 3GPP TSG RAN WGI Meeting #82, Aug. 15, 2015, Beijing, China.
Son, Sang Hyun et al., "Smart Camera Technology to Support High Speed Video Processing in Vehicular Network", The Journal of Korean Institute of Communications and Information Sciences, vol. 40, No. 1, Jan. 2015, pp. 152-164.
T. Streubel "Situation Assesment at Intersection for Driver Assistance and Automated Vehicle Control", Doctor Rerum Naturalium, Dissertation, Technische Universitat Chemnitz (Feb. 2, 2016).
R. Viray, A Sarkar and Z. R. Doerzaph, "Virginia connected vehicle test bed system performance (V2I system performance)", Virginia Tech Transportation Institute (May 1, 2016), Blackburgs, VA, USA.
Inja Jeon et al. "A Study for the Evaluation of V2V Communication Operation Safety", Vol. 7 Issue 3, pp. 25~29, Korean Auto-vehicle Safety Association. 2015.

* cited by examiner

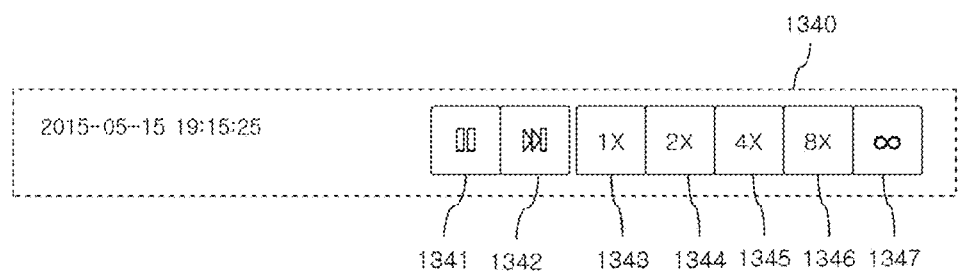
FIG. 19
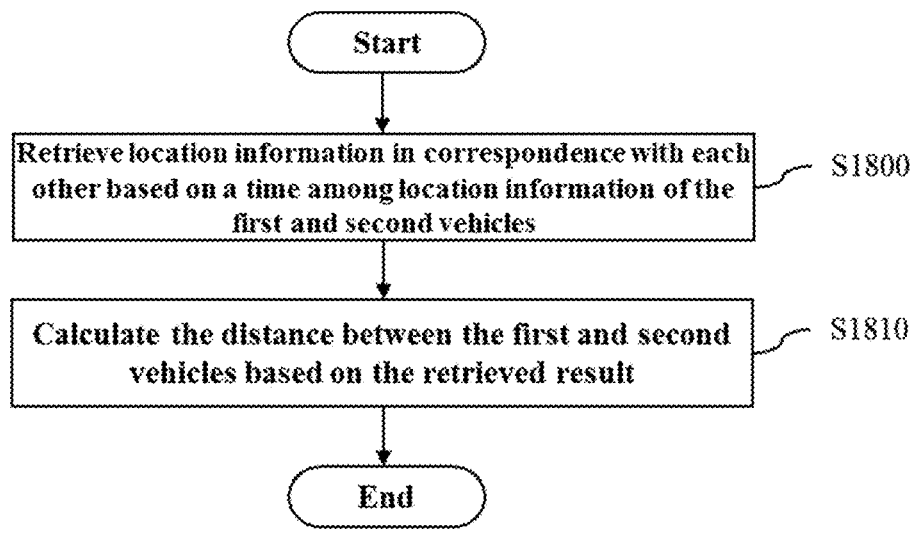
FIG. 20
FIG. 21

Click a rule(s) which you want to apply.

| # | Rule Name | Application Type | Mobility Type | TX Vehicle | RX Vehicle |
|---|---|---|---|---|---|
| 1 | Rule 1 | FCW/EEBL | TX Moving - RX Stationary | V01 | V02 |
| 2 | Rule 2 | IMA | 3/6/12 | V02 | V01 |

FIG. 31

Manage Tags

| # | Time | Application Type | Mobility Type | TX Vehicle | RX Vehicle | Created by |
|---|---|---|---|---|---|---|
| 1 | 2016-03-31 14:45:26 ~ 2016-03-31 14:46:53 | LOS | TX Move (Forward) - RX Stationary | V01 | V02 | LOS (Away) |
| 2 | 2016-03-31 14:48:29 ~ 2016-03-31 14:49:49 | LOS | TX Move (Forward) - RX Stationary | V01 | V02 | LOS (Away) |
| 3 | 2016-03-31 14:51:34 ~ 2016-03-31 14:52:57 | LOS | TX Move (Forward) - RX Stationary | V01 | V02 | LOS (Away) |
| 4 | 2016-03-31 14:47:04 ~ 2016-03-31 14:48:25 | LOS | TX Move (Forward) - RX Stationary | V01 | V02 | LOS (Oncoming) |
| 5 | 2016-03-31 14:50:03 ~ 2016-03-31 14:51:25 | LOS | TX Move (Forward) - RX Stationary | V01 | V02 | LOS (Oncoming) |
| 6 | 2016-03-31 14:53:13 ~ 2016-03-31 14:53:58 | LOS | TX Move (Forward) - RX Stationary | V01 | V02 | LOS (Oncoming) |

FIG. 32

| Type | Description | Example |
|---|---|---|
| Line | Bend line | 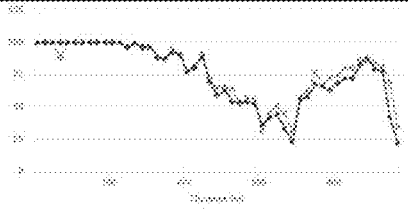 |
| Column | Longitudinal column | 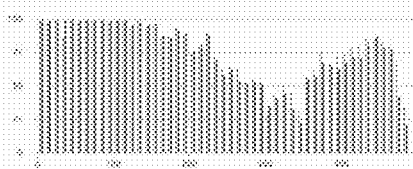 |
| Table | Table | 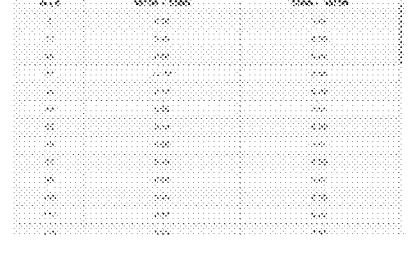 |
| Bubble | Bubble chart | 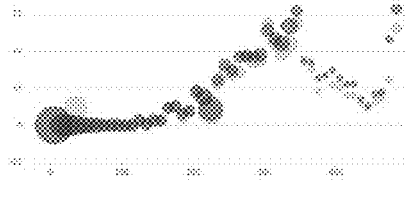 |
| Scatter | Scatter | 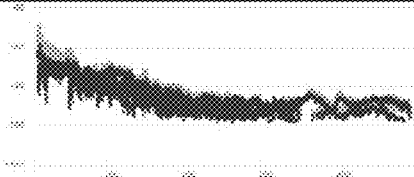 |
| 3D Scatter | 3D Scatter | 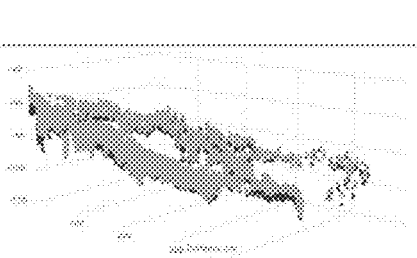 |
FIG. 34

| Type | Description | Unit |
|---|---|---|
| RSSI | Received Signal Strength Indicator | dBm |
| PDR | Packet Delivery Rate | % |
| PER | Packet Error Rate<br>Relationship of 1 − PDR | % |
| PER J2945 | Packet error rate according to SAE J2945<br>When calculating PER, do not judge whether the subject packet is received or not, and use the average of all packets received before 5 seconds in time.<br>In the current version, when using PER J2945, Data rate/Packet length should be selected for the separation of series and scripts cannot be applied. The accuracy of graphs created without this restriction cannot be guaranteed. | % |
| RTT | Round-trip time, it can only be used if the test is configured to include RTT information. | ms |
| Distance | Distance, if the Y-axis is selected for distance, the X-axis can only be selected for time. | meters |

FIG. 35

| Type | Description | Unit | Grouping unit |
|---|---|---|---|
| Time | Time | ms | ms |
| Distance | Distance between two vehicles | meters | meters |
| Relative Velocity | Relative speed between two vehicles | km/h | km/h |
| Angle | Angle between two vehicles | degree | degree |
| TX Power | Transmission power of TX vehicle | dBm | - |
| Data Rate | Beat transmission rate of TX vehicle | mbps | - |
| Packet Length | Packet size | byte | - |

FIG. 36

| # | Vehicle ID | ☑ TX | ☑ RX |
|---|---|---|---|
| 1 | 4875M | ☑ | ☑ |
| 2 | 5380S | ☑ | ☑ |
| 3 | 3297M | ☑ | ☑ |
| 4 | 4129M | ☑ | ☑ |
| 5 | 9812M | ☑ | ☑ |
| 6 | 4594M | ☑ | ☑ |
| 7 | 9112S | ☑ | ☑ |
| 8 | 1478S | ☑ | ☑ |
| 9 | 6271M | ☑ | ☑ |
| 10 | 7729S | ☑ | ☑ |

(Tabs: General | Vehicles | Advanced)

FIG. 37

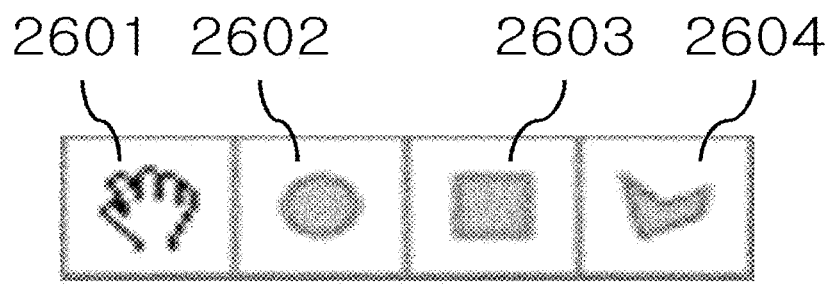
FIG. 38
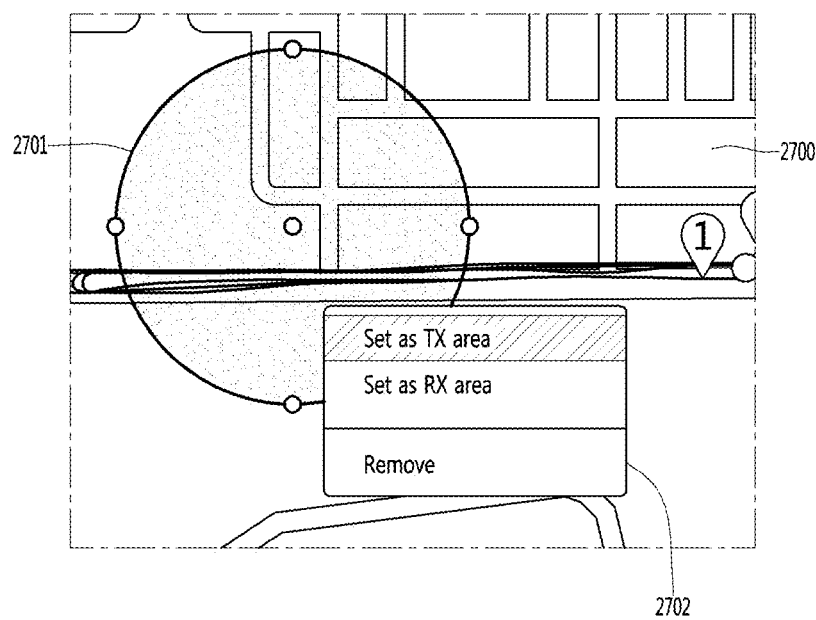
FIG. 39
| Color | Description | Example |
|---|---|---|
| Light red | Transmission region | |
| Light blue | Reception region | |
| Light green | Transmission region + reception region | |
FIG. 40

ANALYSIS METHOD OF VEHICLE-TO-OBJECT COMMUNICATION SYSTEM AND ANALYSIS SYSTEM USING THE SAME

TECHNICAL FIELD

The present invention relates to an analysis method for testing a vehicle-to-object (V2X) communication system and a system for performing the analysis method.

BACKGROUND

Automobiles are developing in the direction of providing safety, mobility, and convenience by combining ICT technology. Sensors such as radar and vision are applied to vehicles to provide drivers with safety support services such as blind spot warnings, collision warnings, and adaptive cruise control (ACC). Also, DSRC (Dedicated Short-Range Communications) communication technology is applied to vehicles to provide convenient services such as automatic fare collection and bus guidance service.

Vehicle safety, cooperative autonomous driving, and C-ITS (Cooperative-ITS) technologies using V2X communication technology have been recently studied. The V2X communication technology refers to vehicle-to-vehicle (V2V) and vehicle-to-infrastructure (V2I) communication from a vehicle perspective.

From a C-ITS perspective that includes vehicles and pedestrians, roads and facilities, and integrated traffic information centers, a comprehensive connectivity may be considered, which includes pedestrian-to-vehicle (P2V), pedestrian-to-driver (P2D), pedestrian-to-infrastructure (P2I) and road sensor network-to-infrastructure (R2I) communication, as well as in-vehicle network.

A number of wireless communication technologies are used to provide all of the connections considered in a C-ITS environment. For example, WAVE (Wireless Access in Vehicular Environments) communication technology is used for V2V/V2I communication, WLAN or Bluetooth technology is used for P2V/P2I communication, and a sensor communication technology is used for R2I communication.

A V2X communication system is designed to provide safety and convenience services for all vehicles running in the C-ITS environment through V2V or V2I-based cooperative communication, and is required to conduct verification and evaluation through repetitive experiments in a laboratory or a real road environment.

However, the verification and evaluation of a V2X communication system in a real road environment requires a lot of time and money due to the nature of the test environment, and it is difficult to repeatedly test the same scenario.

SUMMARY

Technical Task

An object of the present invention is to provide an analysis method for easily and effectively testing a vehicle-to-object (V2X) communication system and a system for performing the analysis method.

Another object of the present invention is to effectively analyze communication performance of a vehicle-to-object (V2X) communication system.

Technical Solution

In an embodiment of the present invention, an analysis method of a vehicle-to-object (V2X) communication system for testing the V2X communication system comprises the steps of: collecting data on a radio signal from the V2X communication system, the radio signal being transmitted or received in the V2X communication system; and transferring at least a portion of the collected radio signal data to a client; wherein the radio signal data is collected from two or more layers of layers constructing the V2X communication system.

The radio signal data collected from the V2X communication system comprises received signal information, vehicle communication messages, logic data calculated using the vehicle communication messages, and application result values determined using the logic data.

By using the radio signal data transferred to the client, at least one of real-time tracking on a result of the test being performed and performance analysis on a completed test result may be performed.

An analysis system according to an embodiment of the present invention can perform the aforementioned analysis method to test the V2X communication system.

The steps of the analysis method of the vehicle-to-object communication system may be performed in the aforementioned analysis system as being constructed as a computer program and the computer program may be stored in a computer-readable medium.

In an embodiment of the present invention, an analysis system for testing the V2X communication system comprises a data collector connected to the V2X communication system of a vehicle through wired or wireless communication and configured to collect data on a radio signal transmitted or received in the V2X communication system; and a server configured to receive the radio signal data collected in the data collector, store it in a database, and transfer at least a portion of the received radio signal data to a client; wherein the radio signal data is collected from two or more layers of layers constructing the V2X communication system.

In an embodiment of the present invention, a method of tracking test data for the V2X communication system comprises the steps of: acquiring location information on a first vehicle and data on a radio signal transmitted or received in a first V2X communication system of the first vehicle; acquiring location information on a second vehicle and data on a radio signal transmitted or received in a second V2X communication system of the second vehicle; constructing a map image for displaying moving paths of the first and second vehicles using the acquired location information; and constructing a graph image for displaying changes in communication performance of the first and second V2X communication system using the acquiring radio signal data; wherein the moving paths on the map image and the communication performance changes on the graph image are displayed in synchronization with each other on the basis of a time.

An analysis system according to an embodiment of the present invention may perform the aforementioned method to track test data, thereby testing the V2X communication system.

The steps of the method of tracking test data may be performed in the aforementioned analysis system as being constructed as a computer program and the computer program may be stored in a computer-readable medium.

Further, in an embodiment of the present invention, an analysis system for testing the V2X communication system comprises a data collector connected to the V2X communication system and a GPS system, which are provided in a vehicle, through wired or wireless communication and configured to collect data on a radio signal transmitted or received in the V2X communication system and location information on the vehicle; a server configured to receive the radio signal data and the vehicle location information collected in the data collector, store them in a database, and transfer at least a portion of the received radio signal data and vehicle location information to a client; and a client configured to construct a map image for displaying a moving path of the vehicle using the location information received from the server and construct a graph image for displaying a change in communication performance of the V2X communication system using the radio signal data received from the server. The radio signal data may be collected from two or more layers of multiple layers constructing the V2X communication system.

In an embodiment of the present invention, a method of analyzing communication performance of the V2X communication system comprises the steps of: selecting the region of interest (ROI) to be analyzed; acquiring data corresponding to the ROI among data on a radio signal transmitted or received in the V2X communication system; and deriving an analysis result using performance indicators corresponding to the acquired ROI data; wherein the ROI is set in a time domain or a space domain, or the ROI is set on the basis of a performance indicator related to at least one of a signal transmitting vehicle or a signal receiving vehicle.

An analysis system according to an embodiment of the present invention may perform the aforementioned method to analyze communication performance of the V2X communication system, thereby testing the V2X communication system.

The steps of the method for analyzing communication performance of the V2X communication system may be performed in the aforementioned analysis system as being constructed as a computer program and the computer program may be stored in a computer-readable medium.

Further, in an embodiment of the present invention, an analysis system for testing the V2X communication system comprises a data collector connected to the V2X communication system of a vehicle through wired or wireless communication and configured to collect data on a radio signal transmitted or received in the V2X communication system; a server configured to receive the radio signal data collected in the data collector, store it in a database, and transfer the received radio signal data; and a client configured to acquire data corresponding to ROI among the radio signal data received from the server and derive an analysis result using performance indicators corresponding to the acquired ROI data; wherein the ROI is set in a time domain or a space domain, or the ROI is set on the basis of a performance indicator related to at least one of a signal transmitting vehicle or a signal receiving vehicle.

Further, in an embodiment of the present invention, a method of analyzing an event of the V2X communication system comprises the steps of: collecting data on a radio signal transmitted or received in each of a first V2X communication system of a first vehicle and a second V2X communication system of a second vehicle; acquiring information on a vehicle communication message transmitted by the second V2X communication system, using the collected radio signal data; acquiring information on an application result value determined in the first V2X communication system based on the vehicle communication message transmitted by the second V2X communication system, using the collected radio signal data; and processing the vehicle communication message transmitted by the second V2X communication system and the application result value determined in the first V2X communication system to be displayed in correspondence with each other.

An analysis system according to an embodiment of the present invention may perform the aforementioned method to analyze an event of the V2X communication system, thereby testing the V2X communication system.

The steps of the method for analyzing an event of the V2X communication system may be performed in the aforementioned analysis system as being constructed as a computer program and the computer program may be stored in a computer-readable medium.

Further, in an embodiment of the present invention, an analysis system for testing the V2X communication system comprises a data collector configured to collect data on a radio signal transmitted or received in each of a first V2X communication system of a first vehicle and a second V2X communication system of a second vehicle; a server configured to receive the radio signal data collected in the data collector, store it in a database, and transfer the received radio signal data; and a client configured to acquire information on an application result value determined in a first V2X communication system based on a vehicle communication message transmitted by a second V2X communication system, using the radio signal data received from the server; wherein the vehicle communication message transmitted by the second V2X communication system and the application result value determined in the first V2X communication system are displayed in correspondence with each other.

Effect of the Invention

According to the aforementioned embodiments, data on a radio signal transmitted or received in the V2X communication system is collected, and the data is transferred to the client to analyze it. Therefore, a test on the V2X communication system can be easily and effectively performed.

Further, according to the aforementioned embodiments, data is collected with respect to multiple layers constructing the V2X communication system, such as received signal information, vehicle communication messages, logic data and application result values. Therefore, the cause of a problem cause can be more accurately analyzed according to the test result.

Further, according to the aforementioned embodiments, the radio signal used to test the V2X communication system is generated in the analysis system itself. Therefore, tests for high risk or repetitive situations can be easily performed.

In addition, since data is collected with respect to multiple layers constructing the V2X communication system, such as received signal information, vehicle communication messages, logic data and application result values, the cause of a problem cause can be more accurately analyzed according to the test result.

Further, according to the aforementioned embodiments, changes in communication performance between the V2X communication systems and moving paths of vehicles are displayed in synchronization with each other on the basis of a time, using the radio signal data collected from the V2X communication system and the vehicle location information. Therefore, information on the overall progress related to a test being performed or a completed test can be confirmed over time.

Further, according to the aforementioned embodiments, the region of interest, in which communication performance of the V2X communication system is analyzed, is set in a time domain or a space domain or set on the basis of a performance indicator related to a signal transmitting/receiving vehicle. Therefore, a meaningful section can be easily extracted and analyzed from the test result.

Further, according to the aforementioned embodiments, the vehicle communication message transmitted or received between vehicles and the application result value determined based on the message are displayed in correspondence with each other over time. Therefore, an application-related test can be easily performed in the V2X communication system.

BRIEF DESCRIPTION OF THE DRAWINGS

FIG. 19 is a view illustrating an embodiment of the user interface (UI) for controlling test data tracking.

FIG. 20 is a view illustrating an embodiment of a method of displaying information on the vehicle.

FIG. 21 is a flowchart illustrating an embodiment of a method of calculating a distance between vehicles.

FIG. 31 is a view illustrating an embodiment of a method of selecting the Rule for extracting data corresponding to the ROI.

FIG. 32 is a view illustrating an embodiment of a method of managing the Tag.

FIG. 34 is a view illustrating the types of graphs for displaying the analysis results.

FIG. 35 is a view illustrating an embodiment of values displayed on the y-axis of the graph.

FIG. 36 is a view illustrating an embodiment of values displayed on the x-axis of the graph.

FIG. 37 is a view illustrating an embodiment of the user interface (UI) provided for selecting a vehicle to be analyzed.

FIGS. 38 to 40 are views illustrating embodiments of a method of setting the region of interest in a space domain.

DETAILED DESCRIPTION OF THE INVENTION

Figure 1:
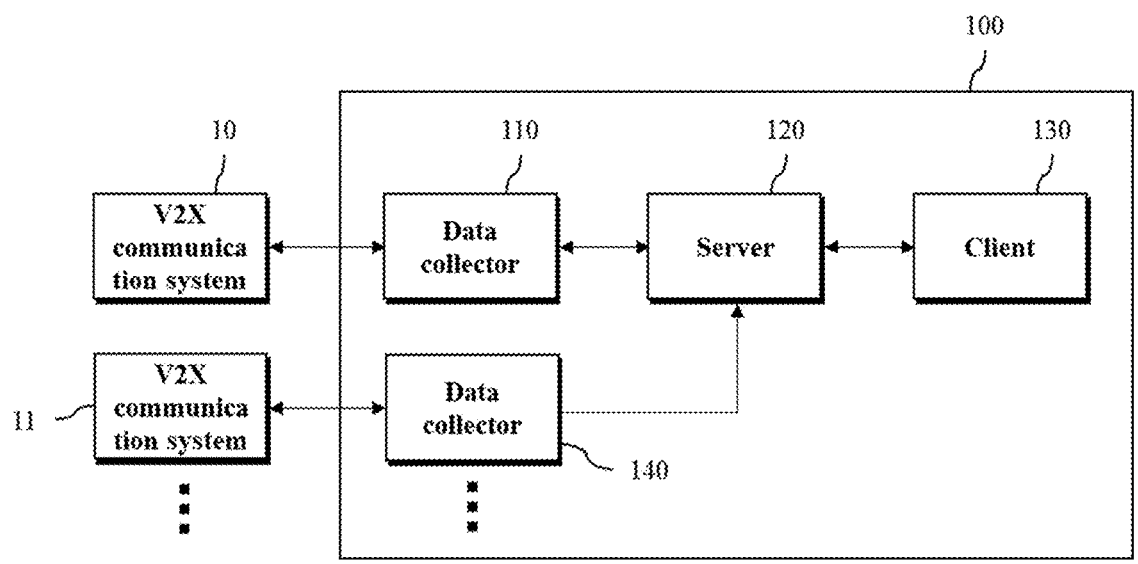
FIG. 1 is a block diagram illustrating the overall configuration of an analysis system according to an embodiment of the present invention.

Hereinafter, an analysis method for a vehicle-to-object (V2X) communication system according to the present invention and an analysis system for performing the method will be described in detail with reference to the appended drawings.

As the present invention can have various variations and embodiments, particular embodiments will be illustrated in the drawings and described in the detailed description. It is to be understood that the present invention are not limited to such embodiments and intended to encompass all variations, equivalents and substitutes which are included in the spirit and scope of the present invention.

In the description of the present invention, terms such as 'a first' and 'a second' may be used to describe various components, but these components may not be limited by the terms. The terms may be used only for distinguishing one component from another component. For example, without departing from the scope of the present invention, the first component may be referred to as the second component, and similarly, the second component may also be referred to as the first component.

The term 'and/or' may include a combination of a plurality of related items or any item of a plurality of related items.

When a component is referred to as being 'linked' or 'connected' to another component, it may be directly linked or connected to that other component, but other components may be present in between. To the contrary, when a component is said to be 'directly linked' or 'directly connected' to another component, it may be understood that no other component exists in between.

The terminology used herein is for the purpose of describing particular example embodiments only and is not intended to be limiting of the present invention. Singular expressions may include plural expressions unless the context clearly indicates otherwise.

The terminology used herein is only for describing particular embodiments and is not intended to limit the present invention. Singular expressions include plural expressions unless the context clearly indicates otherwise.

In this application, the terms "comprise" or "have" are intended to indicate that there is a feature, number, step, operation, component, part, or any combination thereof described in the specification, and one or more other features, and it is to be understood that the present invention does not exclude the possibility of the presence or the addition of one or more features, numbers, steps, operations, components, components, or any combination thereof.

Unless defined otherwise, all terms used herein, including technical or scientific terms, have the same meaning as commonly understood by one of ordinary skill in the art. Terms such as those defined in the commonly used dictionaries should be construed as having meanings consistent with the meanings in the context of the related art, and shall not be construed in ideal or excessively formal meanings unless expressly defined in this application.

In addition, the following embodiments are to provide more sufficient description for those skilled in the art, and the shape and size of elements in the drawings may be exaggerated for clarity.

FIG. 1 is a block diagram illustrating the overall configuration of an analysis system according to an embodiment of the present invention. The analysis system 100 performs an analysis method for testing the V2X communication system 10.

Referring to FIG. 1, the analysis system 100 comprises the data collector 110, the server 120 and the client 130.

The data collector 110 collects data on wireless signals transmitted or received in the V2X communication system 10, and the server 120 transfers the wireless signal data collected in the data collector 110 to the client 130.

The V2X communication system 10 is attached to a vehicle to periodically transfer packet messages related to vehicle safety etc. and periodically receive packet messages from a V2X communication system (not shown) attached to another vehicle.

The packet messages transmitted and received between the V2X communication systems include vehicle's ID information, location information, and state information (for example, driving direction and speed, deceleration and acceleration states, etc.), and may have a standardized message form.

The V2X communication system 10 can recognize a distance between the subject vehicle and a nearby vehicle, an operating state of a nearby vehicle, etc. using packet massages periodically received from the V2X communication system of another vehicle, and can judge a dangerous situation.

The V2X communication system 10 comprises hardware modules and software stacks using technology according to standard specifications such that packet messages can be transmitted and received within a short time between vehicles or between vehicle and infrastructure in a communication environment where a vehicle moves at a high speed.

For example, the WAVE communication technology standardized by IEEE (US) can transmit and receive packet messages between vehicles or between vehicle and infrastructure within a short time of 100 msec up to 1 km in a communication environment where a vehicle moves at a high speed.

Figure 2:
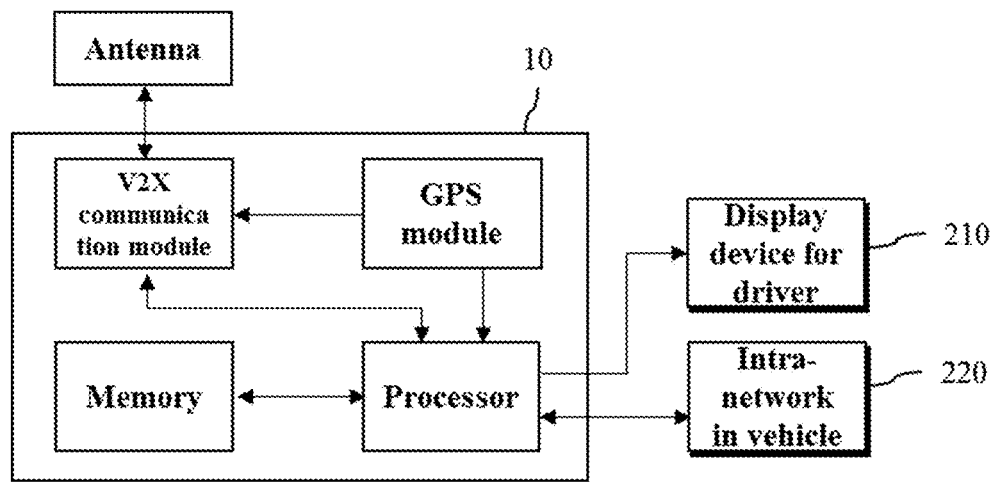
FIGS. 2 and 3 are views illustrating embodiments of the V2X communication system configuration.

The V2X communication system 10 using the WAVE communication technology may comprise a V2X communication module, a GPS module, a memory and a processor, as shown in FIG. 2.

The processor provided with the V2X communication system 10 is a processor to drive a Safety Application, which may be linked to an in-vehicle network. Also, it may send various application results such as warning to a display device for a driver.

The software stacks of the WAVE communication system can be divided into software on kernel and application service software. The software on kernel includes functions such as device driver, MAC transmit/receive, routing, IP packet, WSMP safety message, management and authentication and security protocol functions, and the application service software includes vehicle safety services, cooperative autonomous driving services and driver interfaces.

More particularly, the software stacks of the WAVE communication system are made of a plurality of layers as shown in FIG. 2(b), and the plurality of layers are each designed to satisfy the function and performance of a particular communication specification.

Table 1 shows information on many specifications required to implement the WAVE communication technology.

TABLE 1

| STANDARD | USAGE | OSI LAYER |
|---|---|---|
| IEEE 802.11 (IEEE 802.11P) | WAVE PHY AND MAC | 1 AND 2 |
| IEEE 1609.0 | ARCHITECTURE | N/A |
| IEEE 1609.2 | SECURITY SERVICES FOR APPLICATIONS AND MANAGEMENT MESSAGES | N/A |
| IEEE 1609.3 | NETWORKING SERVICES | 2, 3, AND 4 |
| IEEE 1609.4 | MULTI-CHANNEL OPERATION | 2 |
| IEEE 1609.11 | OVER-THE-AIR ELECTRONIC PAYMENT DATA EXCHANGE PROTOCOL | 7 |
| IEEE 1609.12 | IDENTIFIER ALLOCATIONS | N/A |
| SAE J2735 | DSRC MESSAGE SET DICTIONARY | 7 |
| SAE J2945/1 | ON-BOARD SYSTEM PERFORMANCE REQUIREMENTS FOR V2V COMMUNICATIONS | N/A |

Figure 3:
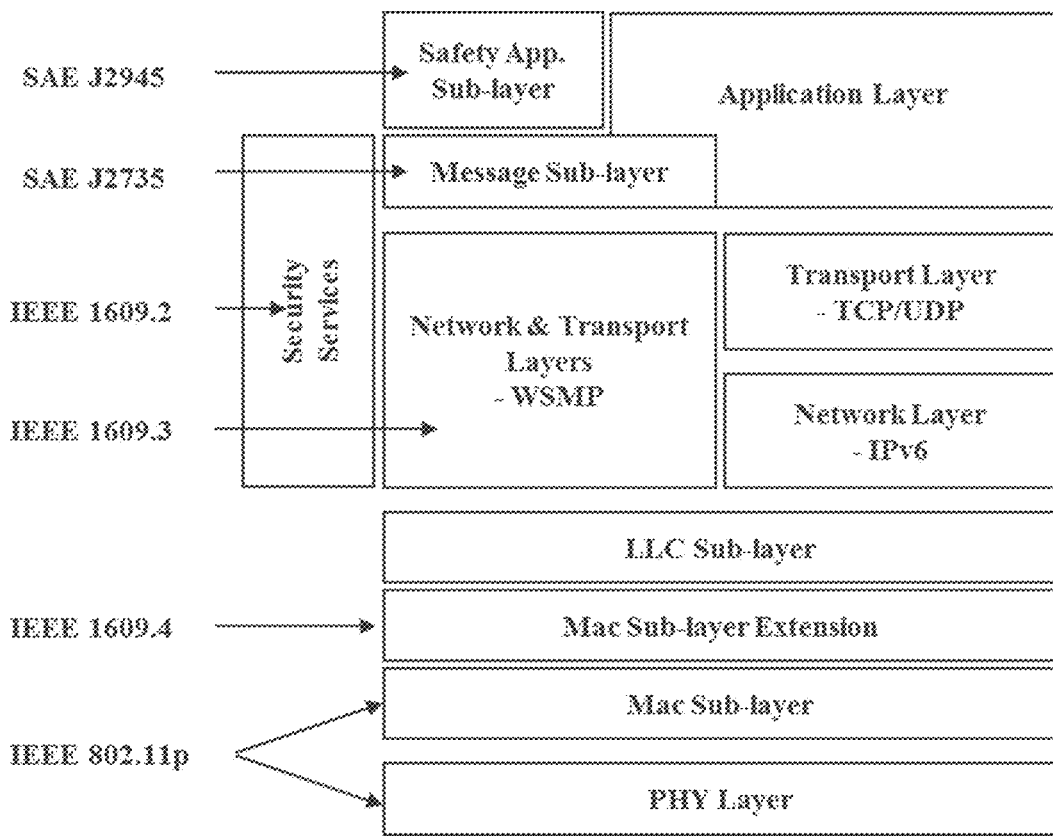

Referring to FIG. 3 and Table 1, the WAVE communication technology is designed to use a frequency band only for 5.9 GHz and satisfy the IEEE 802.11p and IEEE 1609.x standards.

The IEEE 802.11p standard includes a physical (PHY) layer and a MAC layer for wireless transmission, and the IEEE 1609.x standard includes a multi-channel layer, a network layer, an authentication and security layer, and an application service layer that is mounted on the IEEE 802.11p.

The SAE J2735 standard includes a message layer and defines a set of dedicated short range communication (DSRC) messages that are transmitted and received between vehicles or between vehicles and infrastructures.

The SAE J2735 standard includes a message layer and a safety application layer, and defines performance requirements and verification standards required for service.

In an embodiment of the present invention, the V2X communication system 10 may comprise a V2X communication module including a plurality of layers to satisfy the WAVE communication standards as described with reference to FIGS. 2 and 3, and Table 1. However, the present invention is not limited thereto and may be in accordance with other inter-vehicle communication standards.

In addition, as shown in FIG. 1, the analysis system 100 may comprise a plurality of data collectors 110 and 140, and the plurality of data collectors 110 and 140 may collect radio signal data from a plurality of V2X communication systems as described above.

In this case, the server 120 may receive radio signal data collected by each of the plurality of data collectors 110 and 140 to collect radio signal data for all V2X communication systems 10 and 11. The number of data collectors 110 and 140 or V2X communication systems 10 and 11 from which the radio signal data is collected by the server 120 may be set to two or more values according to the performance of the analysis system 110.

Although the present invention has been described by a way of example in which radio signal data for the plurality of V2X communication systems 10 and 11 is collected by the plurality of data collectors 110 and 140, the data may be collected by the data collectors less than the number of V2X communication systems 10 and 11, for example, by one data collector 110.

The server 120 may receive radio signal data collected by each of the plurality of data collectors 110 and 140 as described above, the plurality of data collectors 110 and 140 may collect radio signal data from each of the plurality of V2X communication systems 10 and 11, and the number of V2X communication systems from which the radio signal data is collected by the data collector 110 may be set to two or more values according to the performance of the analysis system 110.

In an embodiment of the present invention, data is collected from two or more layers of the plurality of layers constructing the communication module of the V2X communication system 10 by the data collector 110 in a test process, and the data is transferred to the client 130 through the server 120 to analyze a test result for the V2X communication system 10.

Thus, a test for the V2X communication system 10 can be easily and efficiently performed, and when a problem occurs in the test result, it can be accurately analyzed in which layer the problem occurs.

Hereinafter, particular embodiments of a method and system for analyzing a vehicle-to-object communication system according to the present invention will be described in detail with reference to FIGS. 4 to 13.

Figure 4:
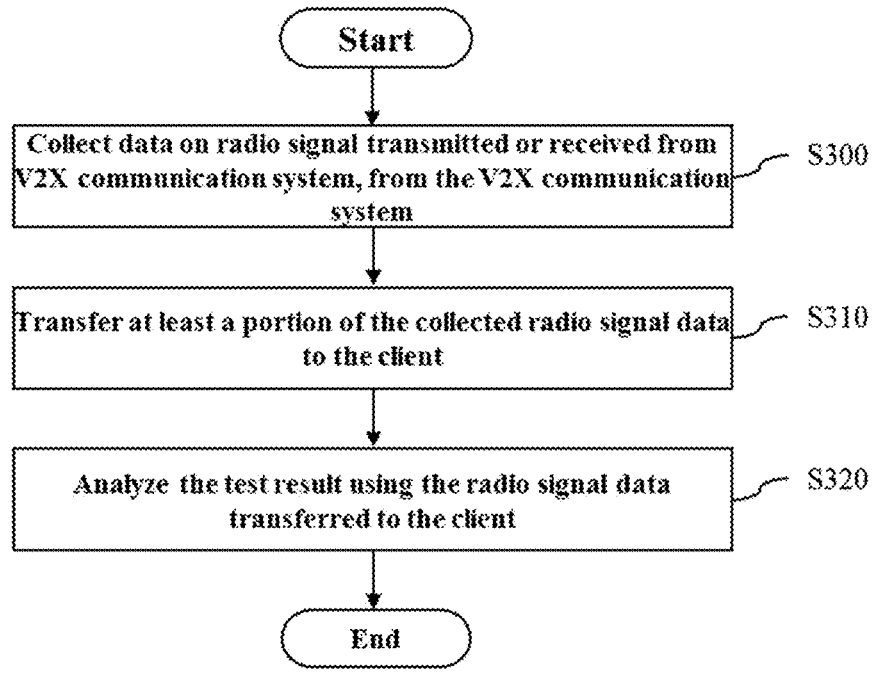
FIG. 4 is a flowchart illustrating an analysis method for testing the V2X communication system according to an embodiment of the present invention.

FIG. 4 is a flowchart illustrating an analysis method for testing the V2X communication system according to an embodiment of the present invention. The analysis method shown in FIG. 4 is described in connection with the block diagram which shows the overall configuration of the analysis system according to an embodiment of the present invention as shown in FIG. 1.

Referring to FIG. 4, the data collector 110 collects data on a radio signal transmitted or received in the V2X communication system 10 from the V2X communication system 10 (step S300).

The radio signal data collected in the step S300 is collected from a plurality of layers constructing the V2X communication system 10, and may include received signal information, vehicle communication message, logic data, application result value, and the like.

Preferably, at least two or more data of received signal information, vehicle communication message, logic data and application result value may be collected from the V2X communication system 10 by the data collector 110.

The received signal information includes Received Signal Strength Indicator (RSSI) and Channel Busy Ratio (CBR), which may be data collected from the physical/MAC layer of the V2X communication system 10.

The data collected from the physical/MAC layer of the V2X communication system 10 is not limited to the received signal strength indicator (RSSI) and the channel busy ratio (CBR), and it may further include signal related information such as Signal to Noise Ratio (SNR) including noise information.

The vehicle communication message includes Basic Safety Message (BSM) data received from one or more other V2X communication systems (not shown) to the V2X communication system 10, which may be data collected from the message layer of the V2X communication system 10.

The basic safety message (BSM) includes BSM data elements as defined in the SAE J2735 standards, and examples may include data such as time (UTC time), position (latitude, longitude, elevation), speed, heading, brake system state (traction, abs, scs, brakeBoost, auxBrakes) and vehicle size (width, length).

The data collected from the message layer of the V2X communication system 10 is not limited to the data as described above, and it may further include data related to nearby vehicles such as PATH HISTORY and PATH PREDICTION.

The logic data is calculated using a vehicle communication message received from one or more other V2X communication systems (not shown) in the V2X communication system 10. It may include Target Classification (TC), Time-to-Collision (TTC), Time-to-Intersection (TTI), Distance to Intersection (DTI), and the like, as defined in the SAE J2945 standard.

The application result value is determined in the V2X communication system 10 using the logic data calculated as described above, and it may include vehicle safety applications such as Forward Crashing Warning (FCW), Emergency Electronic Brake Lights (EEBL), Blind Spot Warning (BSW), Lane Change Warning (LCW) and Intersection Movement Assist (IMA), as required by the SAE J2945 standard.

The logic data and the application result value may be collected from the safety application layer of the V2X communication system 10 by the data collector 110.

The server 120 transfers at least some of the radio signal data collected from the V2X communication system 10 by the data collector 110 in the step S300 to the client 130 (step S310).

Next, the client 130 analyzes a test result for the V2X communication system 10 using the radio signal data transferred from the server 120 (step S320).

For example, the client 130 may perform a real-time tracking of a result of a test currently being performed using radio signal data transmitted from the server 120, or may perform performance analysis on a result of a completed test by transferring radio signal data stored in the database 124 of the server 120.

Although the present invention has been described for functions and operations of each of the data collector 110, the server 120 and the client 130 constructing the analysis system 100 with reference to FIGS. 1 to 4, the present invention is not limited thereto. Two or more of the aforementioned components may be merged into one component, or some of functions and operations of one component may be performed by another component.

In an embodiment of the present invention, as described above, it has been described that the client 130 performs analysis for the test result using radio signal data transferred from the server 120. However, at least some of analysis steps performed by the client 130 may be performed by the server 120.

Also, the data collector 110 may further collect location information from a vehicle to which the V2X communication system 10 is attached, and the collected location information may be synchronized with the radio signal data collected from the V2X communication system 10 and transferred to the client 130 through the server 120.

The client 130 may extract and analyze some of the radio signal data transferred from the server 120, but the present invention is not limited thereto. The server 120 may extract a certain data to be analyzed by the client 130 among the radio signal data collected by the data collector 110 and transfer the extracted data to the client 130.

Figure 5:
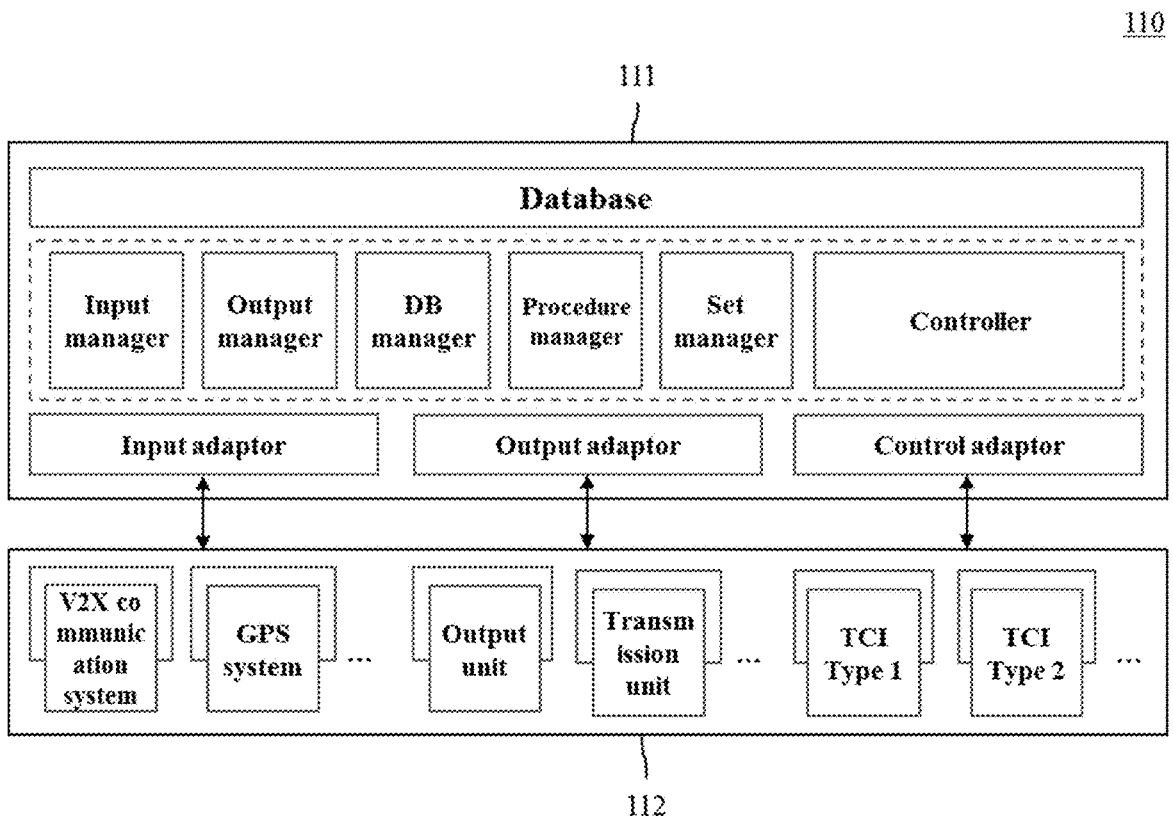
FIG. 5 is a block diagram illustrating an embodiment of the data collector configuration.

FIG. 5 is a block diagram illustrating an embodiment of the data collector configuration. The data collector 110 shown in FIG. 5 comprises the core layer 111 and the plug-in layer 112.

Referring to FIG. 5, the core layer 111 may comprise an input adapter and an output adapter for data input and output, and a control adapter for test control interface (TCI). The test control interface (TCI) may be a specific protocol that works only with a specific V2X communication system, and may be a standardized protocol.

The data collector 110 is wireless or wired connected to the V2X communication system 10 and a positioning system through the input adapter to collect data on radio signals transmitted or received in the V2X communication system 10 and location information of the corresponding vehicle.

The radio signal data and location information collected as described above may be synchronized with each other and temporarily stored in a database of the core layer 111. The radio signal data and location information stored in the database may be exported as a file through an output adapter, or may be sent to the server 120 for upload.

Test control interfaces (TCIs) may be provided that contain conditions for testing the vehicle's V2X communication system 10 through a control adapter of the core layer 111.

Also, the core layer 111 may include a source manager, a sync. manager, a DB manager, a flow manager, a config. manager and a status control may be provided, which function to manage and control the operations of the data collector 110 as described above.

Figure 6:
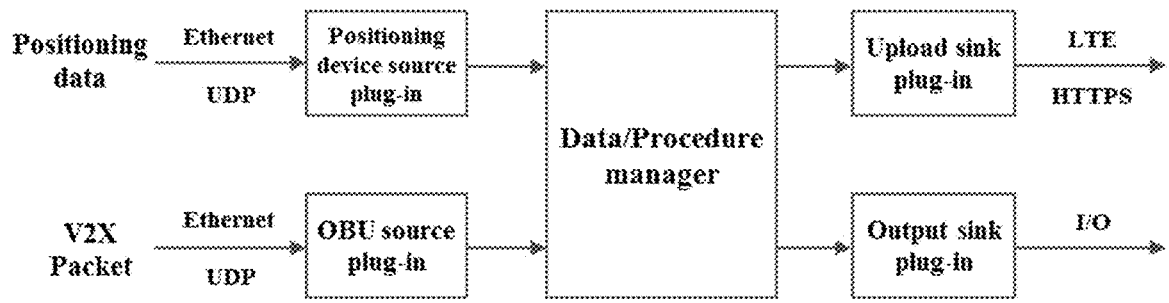
FIGS. 6 and 7 are views illustrating embodiments of the function and operation of the data collector.

Referring to FIG. 6, the data collector 110 may acquire positioning data collected from the positioning system through a source plug-in of the positioning device by User Datagram Protocol (UDP) using an Ethernet communication method.

The Ethernet communication method and the UDP protocol are merely examples of a communication method used by the data collector 110 to collect data, but the present invention is not limited thereto.

The V2X packet and positioning data inputted through the OBU source plug-in and the positioning device source plug-in as described above are synchronized with each other by the data/procedure manager. Then, they may be sent to the server 120 through an upload sync plug-in.

The V2X packet and positioning data may be uploaded to the server 120 by HTTPS using a long term evolution (LTE) communication method, but the present invention is not limited thereto, and various wired and wireless communication methods such as WIFI may be used.

Figure 7:
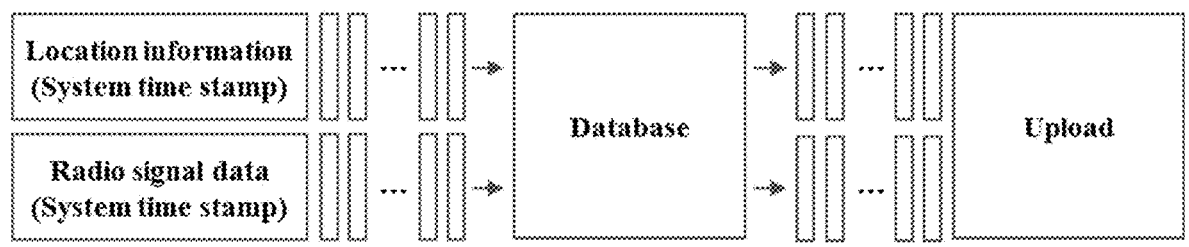

More particularly, as shown in FIG. 7, location information (positioning data) and radio signal data (V2X packets) may be temporarily stored in a database including a system timestamp for time synchronization and then uploaded in the server 120.

Alternatively, the V2X packet and positioning data may be outputted as a file through an export sync plug-in.

As described above, the data collector 110 constructs a data input/output interface in the form of an expandable plug-in to collect data from the V2X communication system and the positioning system as well as various vehicle sensors using communication methods such as Ethernet, USB and CAN and transfer the data in various forms using communication methods such as 3G, 4G and Wifi, and file I/O.

Figure 8:
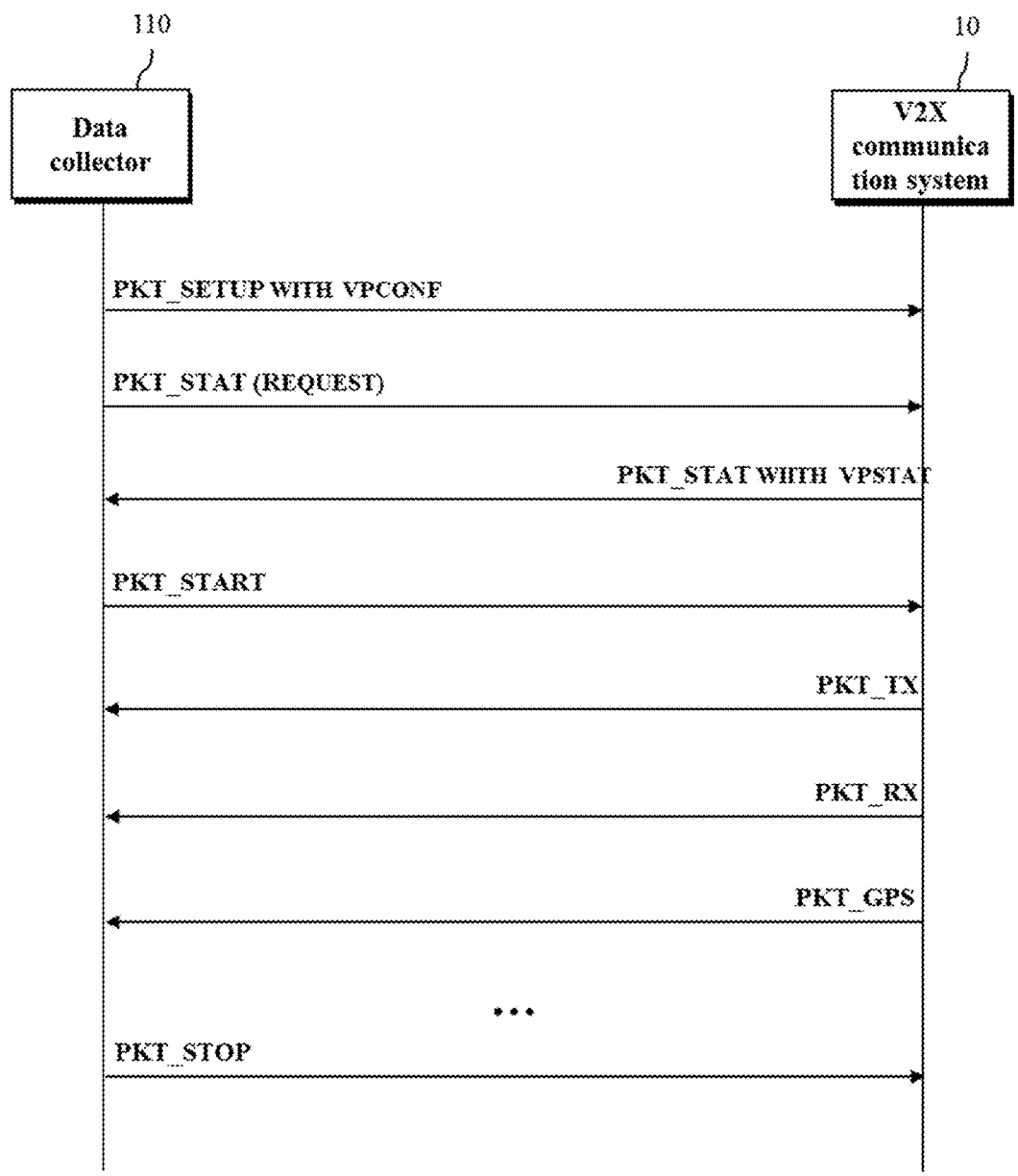
FIG. 8 is a timing diagram illustrating an embodiment of a method of collecting radio signal data from the V2X communication system by the data collector.

FIG. 8 is a timing diagram illustrating an embodiment of a method of collecting radio signal data from the V2X communication system 10 by the data collector 110, and the same descriptions as those described with reference to FIGS. 1 to 7 will be omitted in the following description.

Referring to FIG. 8, the data collector 110 may transmit a "PKT_SETUP" packet to the V2X communication system 10 to set a parameter for testing the V2X communication system 10.

Figure 9:
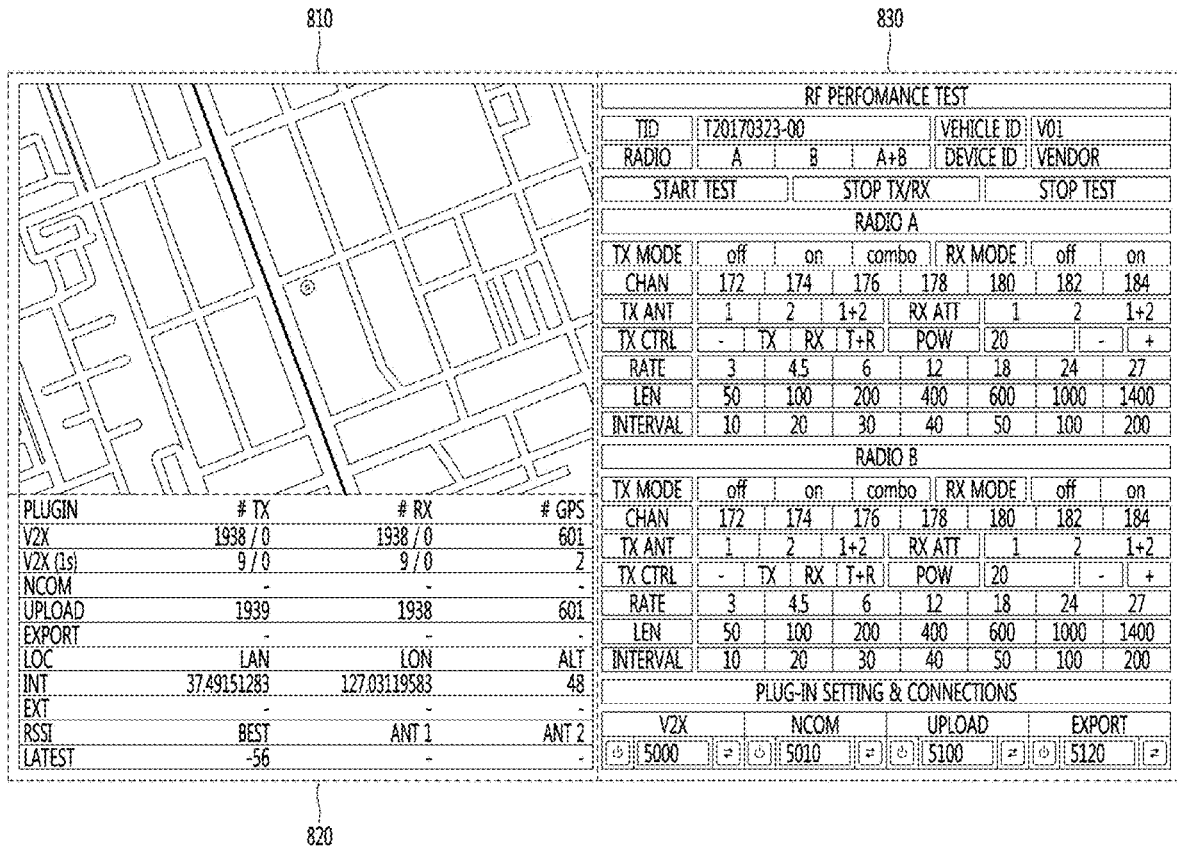
FIG. 9 is a view illustrating an embodiment of the user interface (UI) provided from the data collector.

To this end, first, the data collector 110 may set a communication parameter for performing a test through a user interface (UI) as shown in FIG. 9. The screen of FIG. 9 may be displayed on the client 130, or may be displayed on the data collector 110 when a display module is provided in the data collector 110.

Specifically, "Logger UI" provided from the data collector 110 may include the first region 810 for displaying information on a location on which the test is performed on a map, the second region 820 for indicating V2X/GPS packets, location information (latitude, longitude, altitude) and received signal strength indicator (RSSI) collected from the V2X communication system 10, and the third region 830 for setting parameters for performing radio signal performance tests and verifying the connection and operation state of each plug-in. Through the third region 830, a test ID (TID) for identifying the corresponding test, a vehicle ID (VEHICLE ID) for identifying a vehicle, and a device ID (DEVICE ID) for identifying a V2X communication system to be tested may be given, as well as a radio signal to be tested may be selected.

A user may activate a transmission/reception mode (TX MODE, RX MODE) for a radio signal (RADIO A, RADIO B); set a channel (CHAN); set a transmission/reception antenna (TX ANT, RX ANT); set a transmission/reception control (TX CTRL); or set a packet transmission rate (RATE), a packet length (LEN), a packet interval (INTERVAL) and the like.

In a lower portion of the third region 830, the connections to the outside through input/output plug-ins of the data collector 110 as described above may be set and controlled, respectively, and the connection and information transmission of each plug-in may be confirmed.

The "PKT_SETUP" packet transmitted from the data collector 110 to the V2X communication system 10 may be transferred to the V2X communication system 10 together with a "VPCONF" packet including parameters set through the third region 830 of the "Logger UI", as described with reference to FIG. 9.

Then, the data collector 110 transmits a "PKT_STAT" packet to the V2X communication system 10 to request confirmation of the operation state (normal operation or not) of the V2X communication system 10, and the V2X communication system 10 may transmit a packet (VPSTAT) including information on its operation state (normal operation or not) to the data collector 110.

The operation state confirmation request from the data collector 110 to the V2X communication system 10 and the operation state information response from the V2X communication system 10 to the data collector 110 may be periodically performed.

Then, when the data collector 110 transmits a "PKT_START" packet to the V2X communication system 10 for notifying the start of data collection, packet data (PKT_TX, PKT_RX) and GPS packet data transmitted and received by the V2X communication system 10 may be transmitted to the data collector 110, and data collection may be started.

When the data collector 110 transmits a "PKT_STOP" packet for notifying the end of data collection to the V2X communication system 10, data transmission from the V2X communication system 10 to the data collector 110 may be terminated.

In another embodiment of the present invention, the data collector 110 further includes the function of generating a radio signal to be used for the test of the V2X communication system 10, and thus, a test for a high risk or repetitive situation can be easily performed by the radio signal transmitted from the data collector 110 to the V2X communication system 10.

Figure 10:
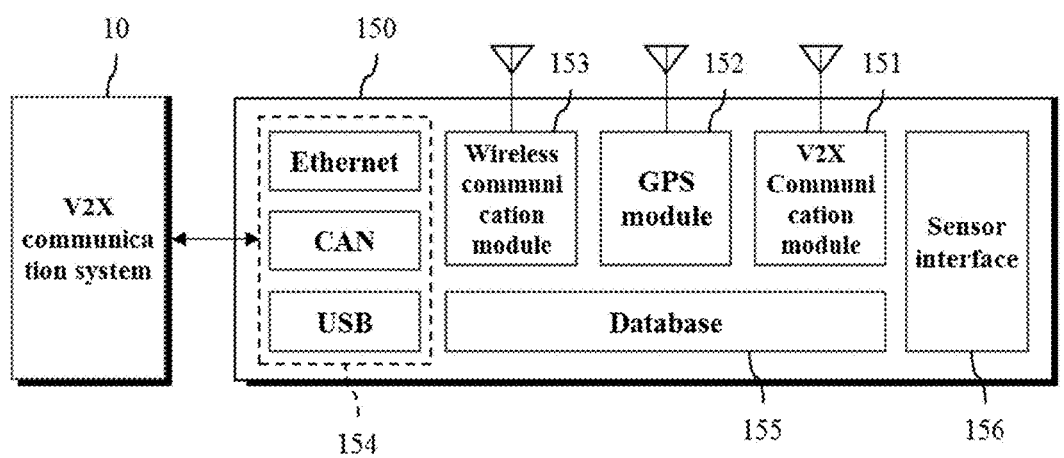
FIG. 10 is a block diagram illustrating an embodiment of the data collector configuration having the function of generating a radio signal.

FIG. 10 is a block diagram illustrating an embodiment of the data collector configuration having the function of generating a radio signal. The data collector shown in FIG. 10 may be implemented in the form of the test box 150 including the V2X communication module 151.

Referring to FIG. 10, the test box 150 may comprise the V2X communication module 151, the GPS module 152, and the wireless communication module 153, as well as a plurality of antennas for transmitting and receiving radio signals.

The V2X communication module 151 is configured to include a plurality of layers according to the vehicle communication standards as described above, and may generate a radio signal including a packet message for vehicle communication and transmit it through the antenna.

Since the configuration and operation of the V2X communication module 151 may be the same as the configuration of the V2X communication system 10 as described above, the detailed description thereof will be omitted.

A radio signal generated by the V2X communication module 151 may include a virtual packet message, which is generated for use in repetitive tests according to the vehicle communication standards (e.g., IEEE 802.11p, IEEE 1609.x, and SAE J2735).

The GPS module 152 may generate a GPS signal including virtual vehicle location information and transmit it through the antenna.

The radio signal generated in the V2X communication module 151 and the GPS signal generated in the GPS module 152 may be received by surrounding V2X communication systems including the V2X communication system 10.

In this case, data on the radio signal and the GPS signal received in the V2X communication system 10 may be collected in the test box 150 through the input interface 154 using communication methods such as Ethernet, CAN and USB.

The radio signal and GPS signal data collected in the test box 150 may be stored in the database 155 and uploaded in the server 120 through the wireless communication module 153 using communication methods such as LTE and WIFI.

Also, various sensing data may be further collected from an external environment through the sensor interface 156 provided in the test box 150.

Figure 11:
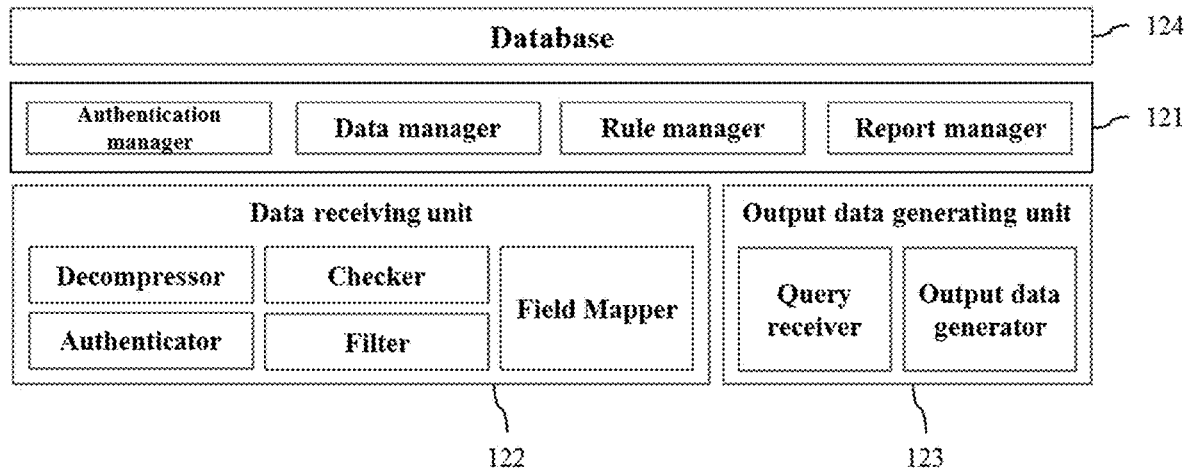
FIG. 11 is a block diagram illustrating an embodiment of the server configuration.

FIG. 11 is a block diagram illustrating an embodiment of the server configuration. The server 120 may comprise the database 124, the management module 121, the data receiving unit 122, and the output data generating unit 123.

Referring to FIG. 11, the radio signal data, which is collected by the data collector 110 and uploaded in the server 120, may be stored in the database 124.

The management module 121 may comprise an authentication manager for managing user authentication etc., a data manager for generating a space to store new test data and granting an ID (TEST ID) to identify the test, a rule manager for managing an analysis rule for extracting data of interest, and a report manager for organizing data on a plurality of tests and providing a report.

The data receiving unit 122 may comprise a decompressor, an authenticator, a validator, a filter and a field mapper, and can collect data under the control of the management module 121.

The output data generating unit 123 may comprise a query receiver for receiving data collected through the data receiving unit 122 and an output data generator for constructing the received data as an output data format to be transferred to the client 130.

The server 120 may generate a test ID (TEST ID) to identify the corresponding test through the management module 121, upload data collected in the data collector 110 through the data receiving unit 122, and construct data to be transferred to the client 130.

For example, the decompressor of the data receiving unit 122 optionally performs the decompression of raw data collected in the data collector 110, the authenticator performs user authentication, and a checker can check the value range of raw data and the test ID (TEST ID).

Then, after invalid data is filtered by the filter, the field mapper may optimize a data field the test ID (TEST ID) and the vehicle ID (VEHICLE ID) and reconstruct a data structure.

The data outputted from the field mapper may be constructed as basic data to be transferred to the client 130 by the output data generating unit 123.

The basic data constructed as described above may be classified as the test ID (TEST ID) and stored in the database 124.

In another embodiment of the present invention, only the data of interest among the basic data constructed as described above may be extracted by the analysis rule and transferred to the client 130.

Figure 12:
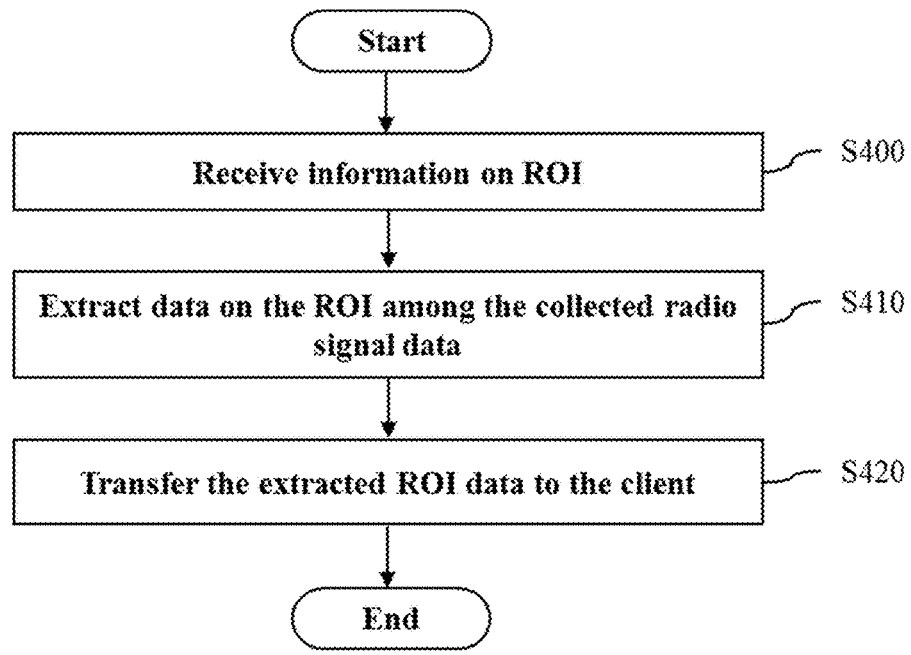
FIG. 12 is a flowchart illustrating an embodiment of a method of transferring radio signal data to the client by the server.

Referring to FIG. 12, the server 120 receives information on the region of interest from which data is extracted from the client 130 (step S400).

The information on the region of interest may be the analysis rule which is generated to set the section of interest by the user at the client 130, and may be stored and managed in the database 124 of the server 120.

The ROI information may include an identification name, an application type, a mobility pattern type, transmission vehicle information, reception vehicle information, a script, and the like.

The identification name is a Rule Name for identifying the corresponding rule, the application type and the mobility pattern type are used to indicate the type of tag to be generated as a result of the rule, the TX vehicle information indicates a vehicle which transmits a radio signal, and the RX vehicle information indicates a vehicle which receives a radio signal.

The script is used to define the region of interest and may be a combination of instructions according to a predetermined grammar for conditions for TX and RX vehicles.

The region of interest may be defined by the script as described above, or alternatively it may be defined by designating an area as a specific shape on a map where a moving position of a vehicle is displayed thereon or automatically.

The rule manager of the server 120 extracts data corresponding to the region of interest among the radio signal data collected by the data collector 110, using the ROI information received in the step S400 (step S410).

In the step S410, the rule manager applies the analysis rule selected by the user at the client 130 among a plurality of analysis rules to the basic data, to extract data corresponding to the ROI according to the analysis rule among data having a particular TEST ID stored in the database 124.

The ROI data extracted in the step S410 is transferred to the client 130 (step S420).

Although the present invention has been described with reference to FIG. 12 by a way of example in which the server 120 extracts data corresponding to ROI among radio signal data collected by the data collector 110 and transfers it the client 130, the present invention is not limited to thereto.

For example, if a TEST ID to be analyzed is selected at the client 130, the server 120 is connected to the selected TEST ID to transfer radio signal data, program codes for analysis and an analysis rule, which are stored in the database 124, to the client 130, and the client 130 performs filtering of the radio signal data on a browser according to the analysis rule transferred from the server 120 to extract the radio signal data to be analyzed.

In another embodiment of the present invention, in order to provide a report analyzing the results of a plurality of tests, radio signal data classified as the a plurality of tests and stored in the database 124 of the server 120 may be arranged in one report data and transferred to the client 130.

Figure 13:
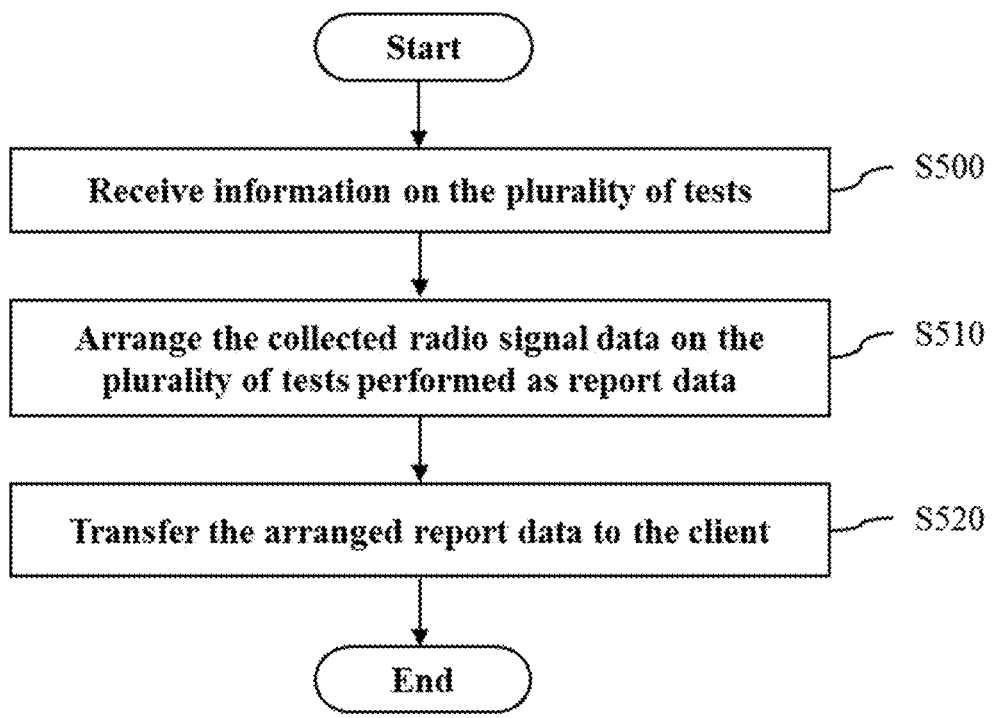
FIG. 13 is a flowchart illustrating another embodiment of a method of transferring radio signal data to the client by the server.

Referring to FIG. 13, the server 120 receives information on the plurality of tests to be arranged in the report from the client 130 (step S500).

The information on the plurality of tests may include test IDs selected by the user in the client 130. Other information such as information on an analysis method and information on a distance grouping value may be received from the client by the server 120 at the step S500.

The information on analysis method indicates a base factor for analysis (for example, one of a simple PER, a moving average PER, and a prediction PER), and the distance grouping value indicates a distance unit to be grouped.

The rule manager of the server 120 arranges, as the report data, radio signal data collected by the data collector 110 when a plurality of data is performed, using the information on the plurality of tests received in the step S500 (step S510).

The radio signal data arranged in the step S1210 may be the ROI data extracted by the analysis rule in the step S410 as shown in FIG. 12.

Then, the report data arranged in the step S510 is transferred to the client 130. By using the radio signal data transferred to the client 130, the client 130 may perform real-time tracking or data analysis.

For example, the real-time tracking may track a vehicle's location in real time for the test being performed and show key performance indicators such as packet error rate (PER) and received signal strength indicator (RSSI).

The data analysis may visualize the collected data based on various performance indicators and extract data of interest.

In FIG. 1, the client 130 may analyze test results for the V2X communication system 10 using the basic data transferred from the server 120.

In an embodiment of the present invention, by using the radio signal data collected from the V2X communication system 10 and the vehicle location information, changes in the communication performance of the V2X communication system 10 and the moving path of the vehicle may be synchronized and displayed on a time basis, thereby identifying information such as the overall progress of the test being performed or completed over time.

The communication performance of the V2X communication system 10 may mean performance related to communication between the V2X communication system 10 and another V2X communication system. In this context, the data collector 110 may be wired or wireless connected to the V2X communication system and the positioning system provided in the vehicle to collect data on radio signals transmitted or received in the V2X communication system and the vehicle location information.

The server 120 may receive the radio signal data and the vehicle location information collected in the data collector 110, store them in a database, and transmit the received radio signal data and vehicle location information to the client 130.

The client 130 constructs a map image for indicating a moving path of the vehicle using the location information received from the server 120, and a graph image for indicating changes in communication performance of V2X communication system using the radio signal data received from the server 120.

Hereinafter, particular embodiments of a test data tracking method for the V2X communication system according to the present invention will be described in more detail with reference to FIGS. 14 to 21.

Figure 14:
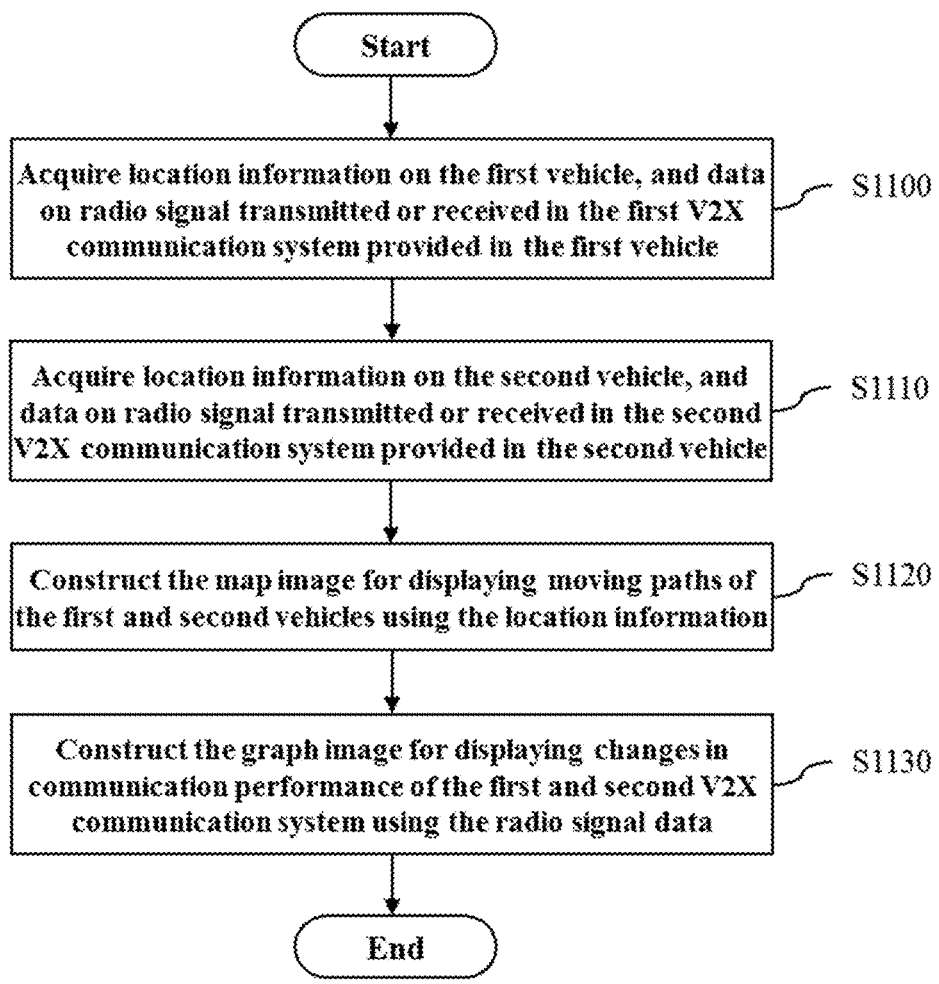
FIG. 14 is a flowchart illustrating a method of tracking test data according to an embodiment of the present invention.

FIG. 14 is a flowchart illustrating a test data tracking method according to an embodiment of the present invention, wherein the radio signal data and the vehicle location information collected in the data collector 110 are transferred to the client 130 through the server 120 to track test data on the V2X communication system.

Referring to FIG. 14, the client 130 acquires the location information of the first vehicle and data on a radio signal transmitted or received in a first V2X communication system provided in the first vehicle (step S1100).

Also, the client 130 acquires the location information of the second vehicle and data on a radio signal transmitted or received in the second V2X communication system provided in the second vehicle (step S1110).

As a method of acquiring the location information for each vehicle and the radio signal data of the V2X communication system by the client 130 in the steps S1100 and S1110, the location data and the radio signal data may be collected from the positioning system and the V2X communication system provided in each vehicle by the data collector 110, the collected data may be transferred to the client 130 through the server 120, as described with reference to FIGS. 1 to 11. The data collector 110 may collect radio signal data from a plurality of layers constructing the V2X communication system. The transmission and reception packets and the received signal strength indicator (RSSI) among the radio signal data collected from the first and second V2X communication systems may be transmitted from the server to the client 130.

Then, the client 130 constructs a map image for displaying moving paths of the first and second vehicles using the location information obtained in the steps S1100 and S1110 (step S1120), and a graph image for displaying a change in communication performance between the first and second V2X communication systems using the radio signal data obtained in the step S1100 and S1110 (step S1130).

After the graph image is constructed, the client 130 may update the graph image for communication performance constructed in the step S1130 using radio signal data additionally transferred.

That is, since the client 130 may receive the radio signal data late due to a network delay in the process of transmitting data collected in real-time from the data collector 110 to the server 120, a graph showing the received signal strength indicator (RSSI) and packet error rate (PER) can be constantly updated.

Figure 15:
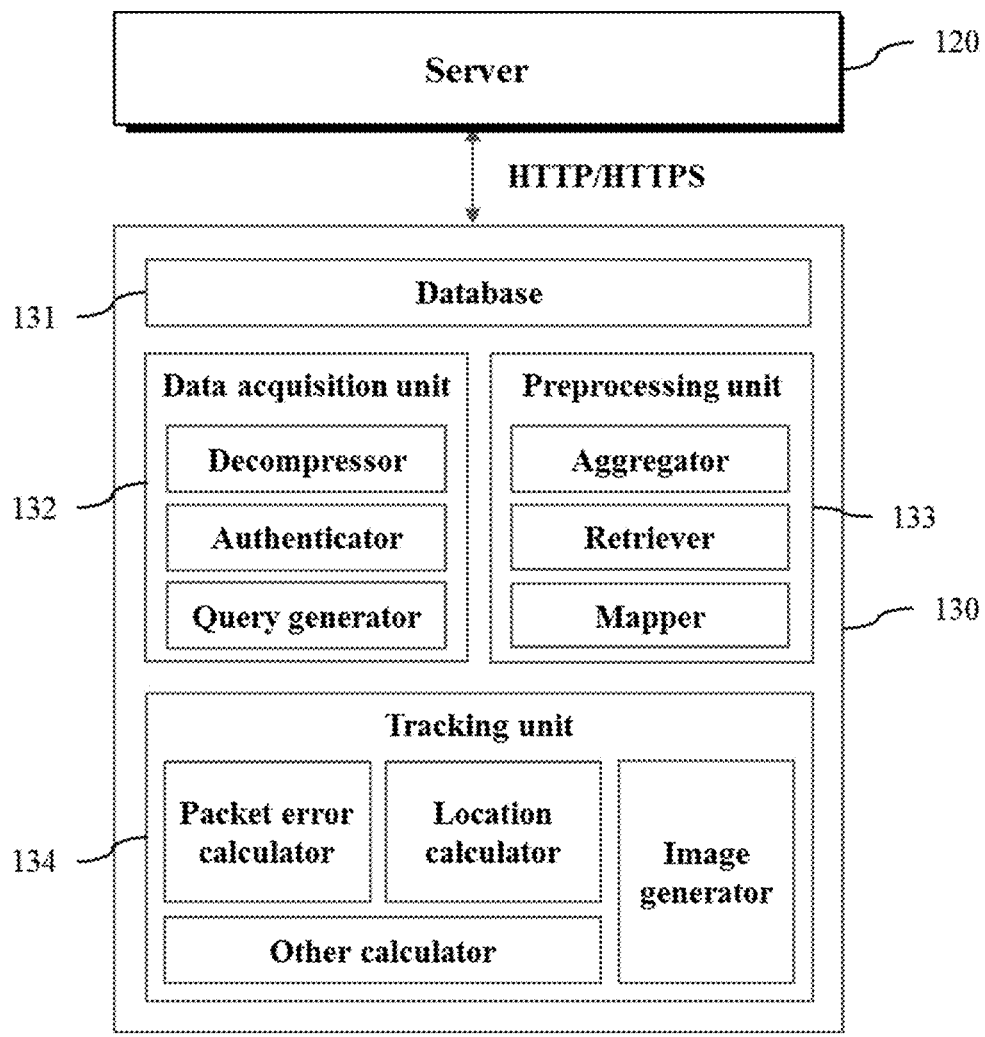
FIG. 15 is a block diagram illustrating an embodiment of the client configuration.

FIG. 15 is a block diagram illustrating an embodiment of the client configuration. The client 130 may comprise the database 131, the data acquisition unit 132, the preprocessing unit 133, and the tracking unit 134. The same descriptions as those described with reference to FIGS. 1 to 14 in relation to the operation of the client 130 as shown in FIG. 15 will be omitted in the following description.

Referring to FIG. 15, the vehicle location information and the radio signal data of the V2X communication system, which is received from the server 120 through the data acquisition unit 132 of the client 130, may be stored in the database 131.

To this end, the data acquisition unit 132 may comprise a decompressor for selectively decompressing data received from the server 120, an authenticator for performing user authentication, and a query generator for inquiry data using a test ID.

The preprocessing unit 133 may perform preprocessing such as aggregation, search and mapping in relation to data obtained through the data acquisition unit 132.

The tracking unit 134 is configured to use a data preprocessing result outputted from the preprocessing unit 133 to calculate performance indicators for tracking test data and construct an image showing the calculated performance indicators updated in real-time.

More particularly, in the tracking unit 134, a packet error calculator may calculate a packet error rate (PER) of the V2X communication system, and a location calculator may calculate a distance between vehicles.

An image generator of the tracking unit 134 constructs a map image for displaying a moving path of a vehicle over time, and a graph image for displaying communication performance such as received signal strength indicator (RSSI), packet transmission rate and packet error rate (PER) of the V2X communication system which are changed over time.

The map image and the graph image constructed as described above may be displayed on a screen through a display module (not shown) provided or connected to the client 130.

Figure 16:
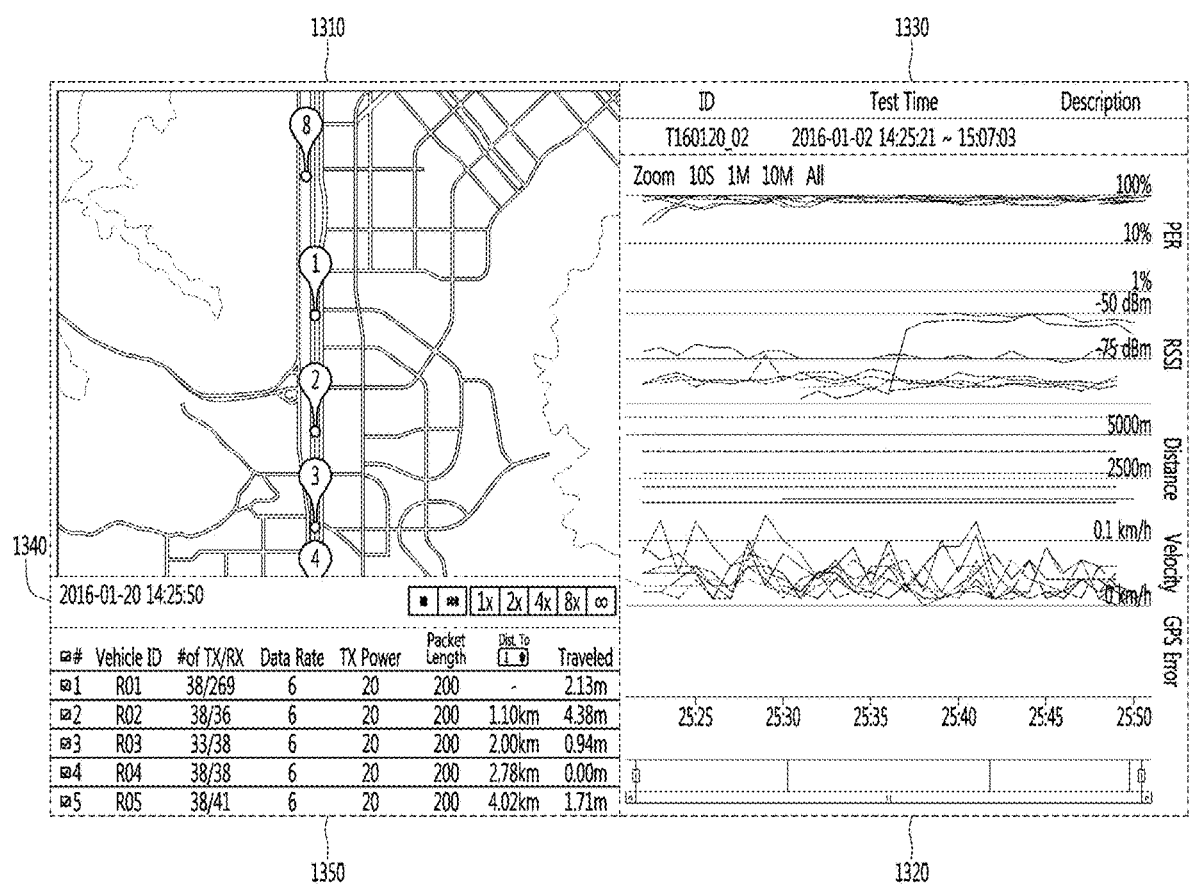
FIG. 16 is a view illustrating an embodiment of the user interface (UI) provided for real-time tracking.

If a Real-time Tracking menu is selected in the analysis system 100 to analyze test data of the V2X communication system and then a TEST ID to be tracked in real-time is selected, a user interface (UI) may be displayed on a screen of the client 130, as shown in FIG. 16.

Referring to FIG. 16, a real-time tracking screen may comprise the map region 1310, the real-time performance indicator region 1320, the test information region 1330, the control region 1340, and the vehicle information region 1350.

A map image indicating the location of each vehicle at the present time along with the moving path of vehicles participating in the test may be displayed on the map region 1310, and the current location of the vehicles may be updated in real-time over time on the map image.

The map image is automatically scrolled to display the moving path and the current location of all vehicles, and its zoom ratio may be changed. However, it may be set to display only the moving path and the current location of the vehicle selected in the vehicle information region 1350.

Graph images indicating packet transmission rate (PDR), received signal strength indicator (RSSI), GPS error and vehicle speed change up to the present time may be displayed on the real-time performance indicator region 1320, so that the user can overall confirm whether the test on the V2X communication system is being normally performed.

As described above, as the current location of the vehicle is updated in real-time on the map image displayed in the map region 1310, and the communication performance indicator up to the present time is shown in real-time on the graph image displayed in the real-time performance indicator region 1320, the vehicle moving path on the map image and the communication performance change on the graph image may be displayed in synchronization with each other based on time.

That is, as the vehicle participating in the test moves, a mark indicating the current location of the vehicle is moved on the map image, and the packet transmission rate (PDR), the received signal strength indicator (RSSI), the GPS error or the vehicle speed is changed in real-time, the corresponding values at the current location of the vehicle may be finally displayed on the right-most side.

Figure 17:
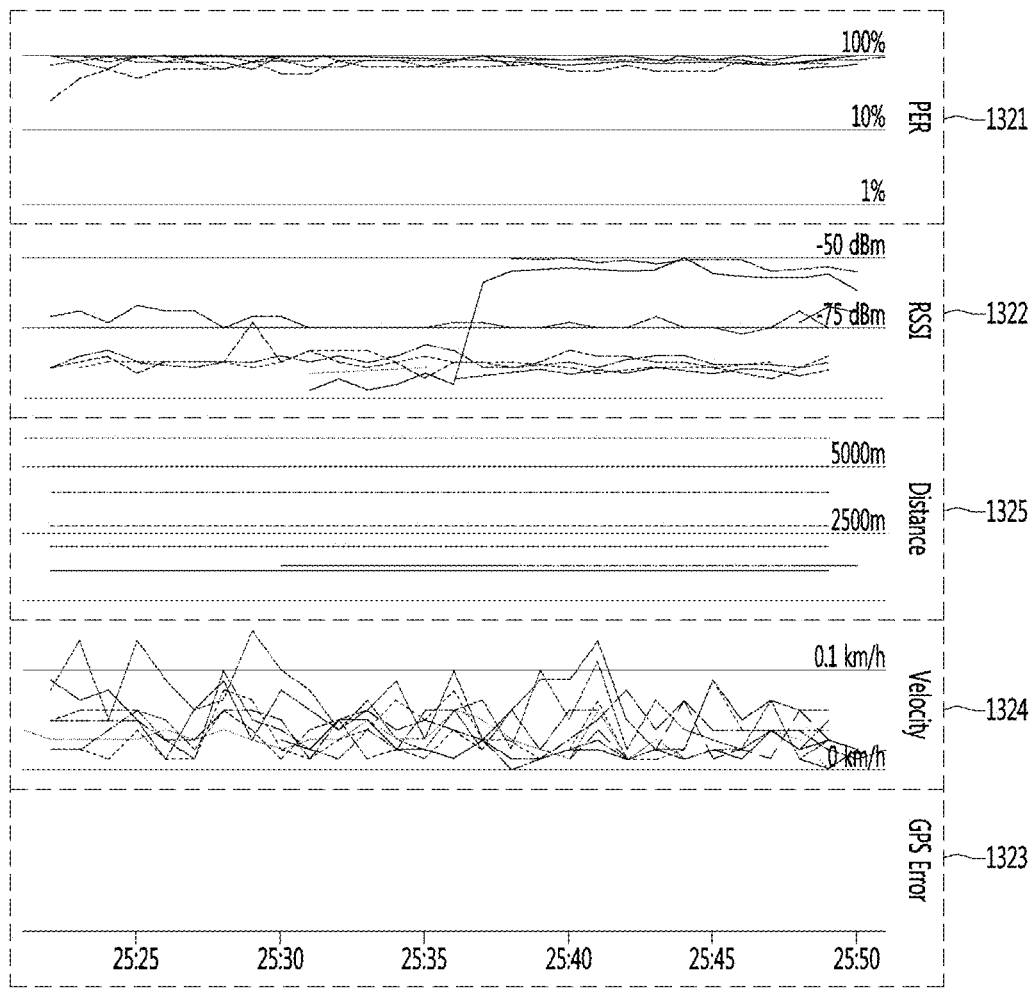
FIG. 17 is a view illustrating an embodiment of the graph image for displaying a change in communication performance of the V2X communication system.

Referring to FIG. 17, the first graph image 1321 displayed in the real-time performance indicator region 1320 shows a change in the packet error rate (PER) for each of the V2X communication systems provided in the vehicles participating in the test as different colors.

In addition, the second graph image 1322 displayed in the real-time performance indicator region 1320 shows a change in the received signal strength indicator (RSSI) for each of the V2X communication systems provided in the vehicles participating in the test as different colors.

For a test using a reference GPS, a change in the GPS error for the location information of each vehicle may be shown on the third graph image 1323 in real-time, and a change in speed for each vehicle may be shown on the fourth graph image 1324 in real-time as different colors.

The received signal strength indicator (RSSI) of the V2X communication systems may be collected from each of the V2X communication systems by the data collector 110; and it may be updated and displayed in real-time according to data transferred to the client 130 through the server 120.

Also, the speed of vehicles may be collected from the positioning system of each vehicle by the data collector 110; and it may be updated and displayed in real-time according to data transferred to the client 130 through the server 120. The packet delivery rate (PDR) or the packet error rate (PER) of the V2X communication systems may be collected from each of the V2X communication systems by the data collector 110 and calculated by mapping data transferred to the client 130 through the server 120.

In addition, the fifth graph image 1325 displayed on the real-time performance indicator region 1320 may show a change in distance between vehicles participating in the test as different colors, and the distance between vehicles may be a distance from a vehicle set as a reference vehicle in the vehicle information region 1350.

Figure 18:
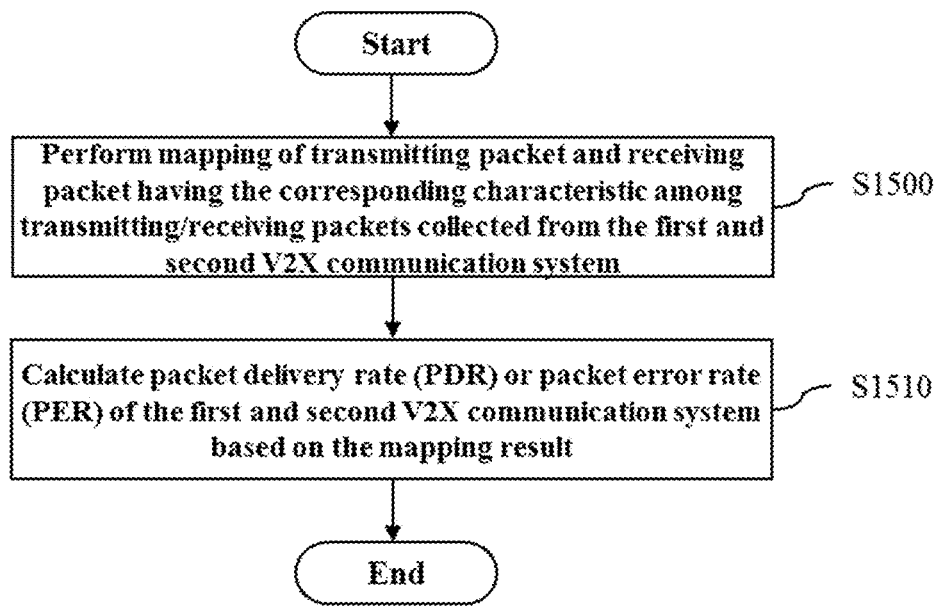
FIG. 18 is a flowchart illustrating an embodiment of a method of obtaining a packet delivery rate (PDR) or a packet error rate (PER) of the V2X communication system.

FIG. 18 is a flowchart illustrating an embodiment of a method of obtaining a packet delivery rate (PDR) or a packet error rate (PER) of the V2X communication system.

Referring to FIG. 18, the preprocessing unit of the client 130 performs mapping of a transmission packet and a reception packet having characteristics corresponding to each other among transmission and reception packets collected from the first and second V2X communication systems (step S1500).

For example, for each packet data (TX data) transmitted from the first V2X communication system, it may be searched whether packet data (RX data) having the same signature as the corresponding transmission packet data (TX data) is received in the second V2X communication system within a time range (Ti+α) until a predetermined time (α) elapses from a transmission time (Ti).

According to a result thus searched, a mapping graph may be generated for all pairs of transmission/reception packets (TX data and RX data) having the same signature.

More particularly, in a broadcast transmission-based vehicle-to-vehicle communication method such as WAVE/DSRC, an identifier is written for each packet transmitted wirelessly, and therefore, in a receiving system, a packet forwarding rate (PDR) or a packet error rate (PER) may be calculated by a combination of an identifier (A) for a sender and an identifier (1, 2) for each packet.

Also, the packet error rate (PER) may not be calculated for a section that is not meaningful. For example, the packet error rate (PER) may be calculated only in a section where transmission or reception of both the sender (Tx) and the receiver (Rx) starts.

Then, the tracking unit of the client 130 calculates the packet transfer rate (PDR) or the packet error rate (PER) for each of the first and second V2X communication systems based on the mapping result in the step S1500 (step S1510).

In the step S1510, using mapping data between the first and second vehicles having different vehicle IDs, the packet forwarding rate (PDR) or the packet error rate (PER) may be calculated, and the calculated result value may be updated after being sampled or averaged for a certain period and displayed on the graph image.

The test information region 1330 may display a test ID for identifying a test that is currently being tracked and test execution time information, as well as the description of the performed test data tracking method.

In the control region 1340, a user interface (UI) for controlling the tracking of test data may be provided.

Referring to FIG. 19, a time corresponding to the current time point may be the control region 1340, and a plurality of buttons 1341 to 1347 for controlling the tracking may be provided therein.

For example, the user can pause or resume the real-time tracking by pressing the first button 1341, and move a tracking time point to the most recent data (i.e., data at the current time point) by pressing the second button 1342.

By the tracking for test data as described above, it is possible to track the test currently being performed in real-time, as well as it is also possible to retrieve the test data already completed and stored in the database of the server 120 to perform the tracking over time. In this case, the user may press any one of the third to sixth buttons 1343 to 1346 to change the tracking speed to a speed corresponding to each button.

Meanwhile, when the user presses the seventh button 1347, it is possible to track the test data at the maximum speed according to the environment of the analysis system 100.

Finally, the vehicle information region 1350 may display information on all vehicles participating in the test.

In addition, if there is no data to be reproduced beyond a predetermined time (e.g., several seconds) during tracking of the test data, the reproduction speed may be automatically changed to a maximum speed up to a section where the data to be reproduced is located.

Referring to FIG. 20, the vehicle information region 1350 may display a vehicle ID, transmission/reception data amount (# of TX/RX), a data rate, data transmission power (TX Power), a packet length, a distance between vehicles, a total driving distance, and the like.

Also, a user interface (UI) may be provided in the vehicle information region 1350, to select a reference vehicle for calculating the distance between vehicles in a plurality of vehicles and select a vehicle for which the moving path and the current location are displayed.

The user may select an index of a vehicle, which is a distance display criterion, in the box 1351 displayed in the distance between vehicles.

FIG. 21 is a flowchart illustrating an embodiment of a method of calculating a distance between vehicles.

Referring to FIG. 21, the preprocessing unit of the client 130 searches location information corresponding to each other in terms of time among location information of first and second vehicles (step S1800).

For example, when the location information is collected from the positioning system provided in the first vehicle, the location information collected from the positioning system provided in the second vehicle at the same time (Ti±β) within a desired error (β) from the collection time (Tc) may be searched.

Meanwhile, location information corresponding to packet transmission/reception time may not exist. In this case, coordinates adjacent to a location of a received packet may be used; a location may be calculated using two temporally adjacent coordinates in a time ratio manner; or a location estimated by location and speed may be used.

Then, the tracker of the client 130 calculates the distance between the first and second vehicles based on the search result in the step S1800 (step S1810).

In the step S1810, using the location information retrieved as being collected at the same time from the first and second vehicles having different vehicle IDs, the distance between the first and second vehicles, and the calculated result value may be updated after being sampled or averaged for a certain period.

Also, the user may select the checkboxes 1354 and 1355 displayed in the index for each vehicle to set to display the current location of the vehicle always on the map image, and may select the checkbox 1353 at the top to set the selection and deselection of all vehicles.

Although the present invention has been described by a way of example in which the communication performance between the V2X communication systems provided in vehicles is tracked and analyzed, the present invention is not limited thereto.

For example, as shown in FIG. 16, information on a base station communicating with surrounding vehicles may be additionally displayed in the vehicle information region 1350, and the location and communication performance of the base station may be displayed in the map region 1310 and the real-time performance indicator region 1320.

Since a method for tracking the information, location, and communication performance of the base station may be the same as those previously described with reference to the drawings, the detailed description thereof will be omitted.

In another embodiment of the present invention, the client 130 may acquire data of a video taken with a camera provided in the vehicle, and play the video data on a real-time tracking screen as shown in FIG. 16.

In this case, the played video data may be synchronized based on a moving path on the map image and a change in communication performance on the graph image and a time, as described above.

In another embodiment of the present invention, since it is possible to extract data corresponding to the region of interest to be analyzed from the radio signal data collected from the V2X communication system 10 and analyze it, a meaningful section can be easily extracted and analyzed in the test result.

For example, the region of interest may be set in a time or space domain, or alternatively may be set based on a performance indicator associated with a signal transmitting/receiving vehicle.

To this end, the data collector 110 may be wired or wireless connected to the V2X communication system provided in the vehicle to collect data on radio signals transmitted or received in the V2X communication system.

The server 120 may receive the radio signal data collected by the data collector 110, store the received data in the database, and transmit the received data to the client 130.

The client 130 may acquire data corresponding to the region of interest among the radio signal data received from the server 120 and derive an analysis result using performance indicators corresponding to the acquired ROI data.

The data collector 110 collects the vehicle location information from the positioning system provided in the vehicle. The collected vehicle location information may be transferred to the client 130 through the server 120, so that the client 130 may acquire additional vehicle location information corresponding to the region of interest.

Hereinafter, particular embodiments of a method and system for analyzing communication performance of the V2X communication system according to the present invention will be described in detail with reference to FIGS. 22 to 40.

Figure 22:
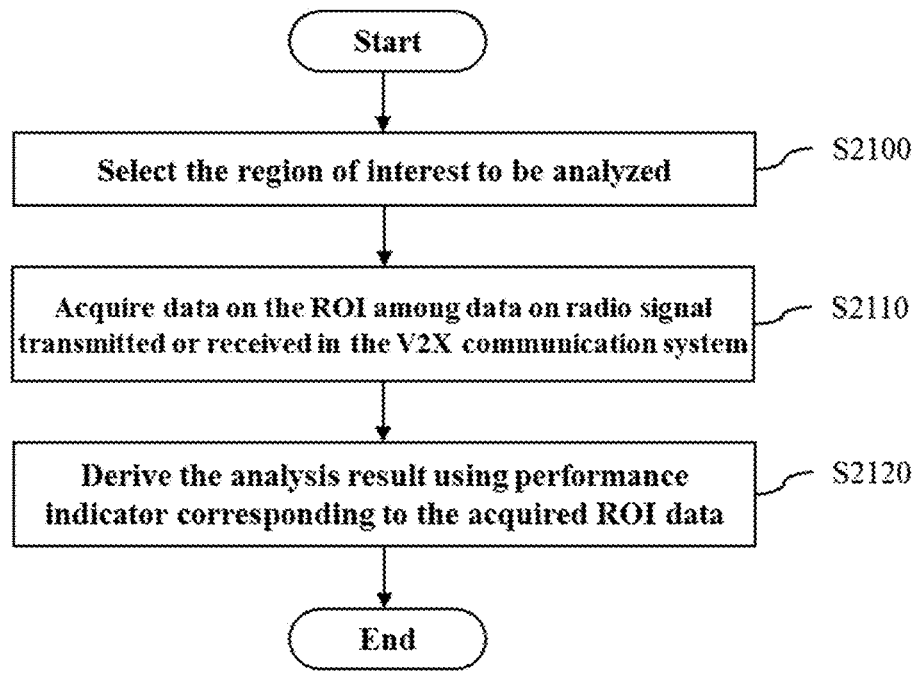
FIG. 22 is a flowchart illustrating a method of analyzing communication performance of the V2X communication system according to an embodiment of the present invention.

FIG. 22 is a flowchart illustrating a method of analyzing communication performance of the V2X communication system according to an embodiment of the present invention, wherein radio signal data collected in the data collector 110 of the analysis system 100 is transferred to the client 130 through the server 120 to analysis the performance of the V2X communication system.

Referring to FIG. 22, the client 130 selects the region of interest to be analyzed (step S2100).

For example, the radio signal data collected during the completed test process is stored in a database of the server 120, and a user may select a test ID to be analyzed and the region of interest. The region of interest may be set in a time or space domain, or alternatively may be set based on a performance indicator associated with at least one of a signal transmitting vehicle and a signal receiving vehicle.

The region of interest may be set by designating a start time and an end time of analysis on a time domain, or by designating an area on a map image indicating a moving path of vehicles transmitting and receiving radio signals.

Alternatively, the region of interest may be set based on a performance indicator indicating a motion characteristic associated with at least one of the signal transmitting vehicle and the signal receiving vehicle, wherein the motion characteristic may include a vehicle position, a vehicle speed, a vehicle driving direction, an angle between driving directions of vehicles, a relative speed between vehicles, and the like.

The region of interest may be set based on a performance indicator indicating a signal characteristic associated with at least one of the signal transmitting vehicle and the signal receiving vehicle, wherein the signal characteristic may include a signal transmission strength, a data transmission rate, a received signal strength, a packet round trip time, a packet length, and the like.

A rule for extracting data corresponding to the region of interval of interest may be predefined in the system or generated by a user, and the data extraction rule may be stored in a database of the server 120.

Then, the client 130 acquires the data corresponding to the region of interest interval among the radio signal data which is transmitted or received in the V2X communication system (step S2110).

To this end, the server 120 may retrieve data corresponding to the test ID selected by the user in the database and transmit it to the client 130, and the client 130 may receive vehicle positioning data synchronized using a time stamp from the server 120 together with the radio signal data of the V2X communication system.

As a method of acquiring the radio signal data of the V2X communication system and the vehicle positioning data by the client 130 in the step S2110, the radio signal data and the positioning data may be collected from the V2X communication system and the positioning system provided in each vehicle by the data collector 110, the collected data may be transferred to the client 130 through the server 120, as described with reference to FIGS. 1 to 11. The data collector 110 may collect the radio signal data from a plurality of layers constructing the V2X communication system.

In order to acquire the data corresponding to ROI by the client 130 in the step S2100, the client 130 may perform filtering of the data received from the server 120, or the data filtered in the server 120 may be transferred to the client 130, which will be described in detail with reference to FIG. 23.

After the ROI data is obtained, the client 130 derives an analysis result using performance indicators corresponding to the acquired ROI data (the step S2120).

Herein, the client 130 may generate a two-dimensional or three-dimensional graph for displaying one or more performance indicators, and the performance indicators may be freely designated as values of x-, y-, and z-axes of the graph.

For example, in a two-dimensional graph, after a first performance indicator to be displayed on the x-axis and a second performance indicator to be displayed on the y-axis from a plurality of performance indicators are selected, a graph may be generated to display the first performance indicator on x-axis and display the second performance indicator on y-axis.

The performance indicators may be calculated using the radio signal data and the positioning data obtained in the step S1112. The performance indicators may include received signal strength indicator (RSSI), packet transmission rate (PDR), packet error rate (PER), packet round trip time (RTT), distance between vehicles, time, relative velocity between vehicles, angle between driving directions of vehicle, signal power intensity (TC power), data rate and packet length, and the like, but the present invention is not limited thereto.

Figure 23:
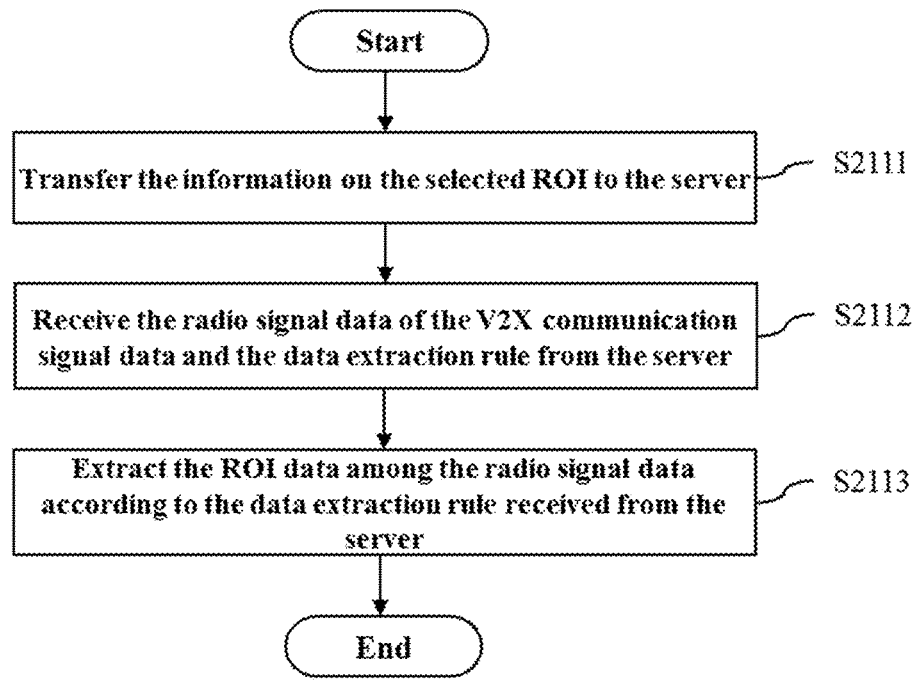
FIG. 23 is a flowchart illustrating an embodiment of a method of acquiring the ROI data of FIG. 22.

FIG. 23 is a flowchart illustrating an embodiment of a method of acquiring the ROI data, which represents a method of acquiring the ROI data by the client 130 in the S2110 of FIG. 22.

Referring to FIG. 23, the client 130 transmits information on the ROI data selected by the user to the server 120 (step S2111).

For example, when the user selects a TEST ID to be analyzed, data selection rules that can be selected for the test may be displayed. When the user selects a data extraction rule for application to an analysis among the displayed data extraction rules, information on a name for identifying the corresponding data extraction rule may be transferred from the client 130 to the server 120.

In this case, the server 120 may search the database using the information (for example, an identification name) on the data extraction rule (Rule) transferred from the client 130, and transfer the rule to the client together with the radio signal data.

Hence, the client 130 receives the rule from the server 120, by which the radio signal data collected by the V2X communication system 10 and the data corresponding to the ROI can be extracted (step S2112).

Then, according to the data extraction rule received from the server 120, the client 130 extracts the data corresponding to the ROI among the radio signal data received from the server 120.

Although the present invention has been described with reference to FIG. 23 by a way of an example in which the server 130 transfers the data extraction rule for ROI to the client 130, and the client 130 extracts the ROI data, but the present invention is not limited to this.

For example, the server 120 may extract ROI data by searching a data extraction rule for ROI selected by the client 130 in the database and applying it to the radio signal data collected by the data collector 110. In this case, the client 130 may receive the radio signal data extracted to correspond to the ROI from the server 120.

Figure 24:
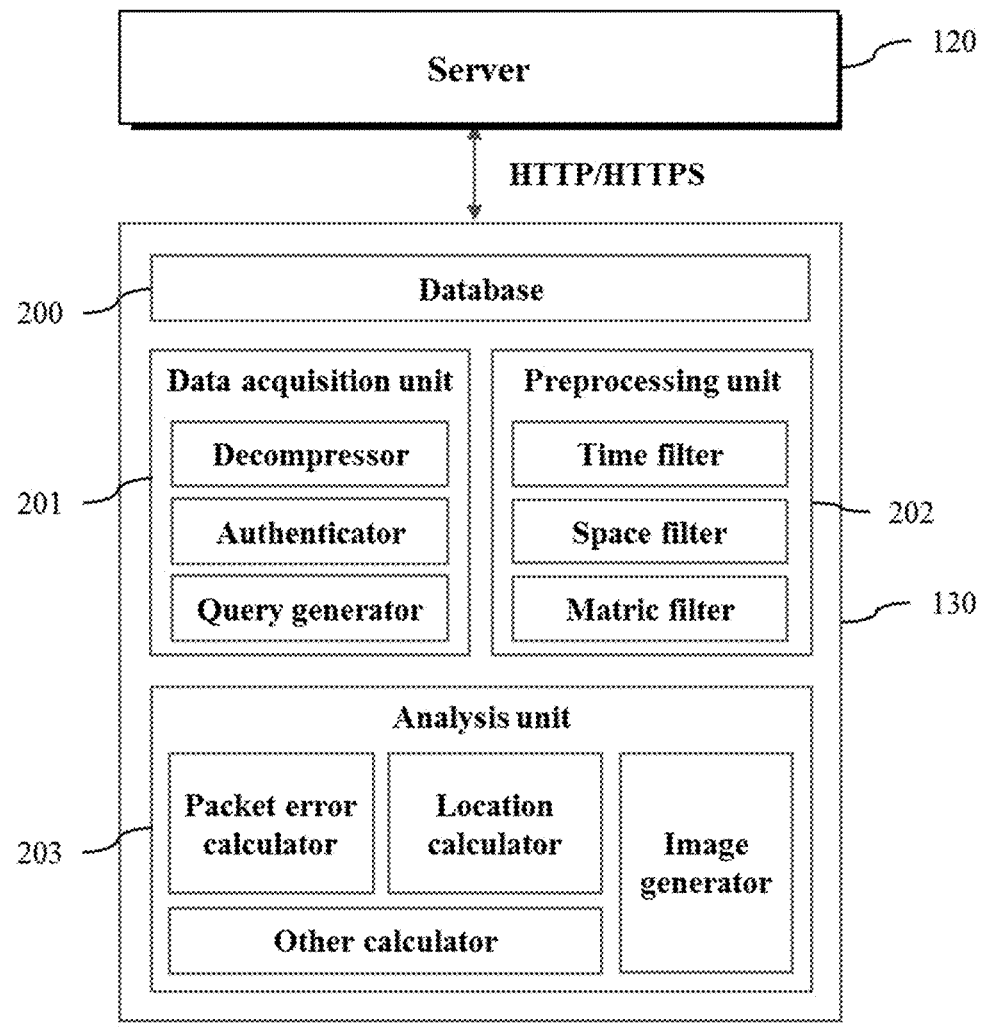
FIG. 24 is a block diagram illustrating another embodiment of the client configuration.

FIG. 24 is a block diagram illustrating an embodiment of the client configuration. The client 130 may comprise the database 200, the data acquisition unit 201, the preprocessing unit 202, and the analysis unit 203. The same descriptions as those described with reference to FIGS. 1 to 23 in relation to the operations of the client 130 as shown in FIG. 24 will be omitted in the following description.

Referring to FIG. 24, data received from the server 120 through the data acquisition unit 201 of the client 130 and the ROI data extracted by the preprocessing unit 202 may be stored in the database 200.

To this end, the data acquisition unit 201 may comprise a decompressor for selectively decompressing data received from the server 120, an authenticator for performing user authentication, and a query generator for inquiry data using a test ID.

The preprocessing unit 202 may apply filtering such as a time filter, a space filter, and a metric filter to the data received from the server 120 through the data acquisition unit 201 to extract the ROI data.

For example, when the ROI is determined in a time domain, the time filter is applied to data received from the server 120 to extract data corresponding to a specific time range, and when the ROI is determined in a spatial domain, the space filter may be applied to data received from the server 120 to extract data corresponding to a specific location area.

Also, when the ROI is determined based on a performance indicator indicating a motion characteristic or a signal characteristic of a signal transmitting/receiving vehicle, the metric filter is applied to data received from the server 120 to extract data corresponding to a specific performance condition.

The analysis unit 203 is configured to use ROI data outputted from the preprocessing unit 202 to calculate performance indicators for analyzing test results and construct an image such as a graph showing the calculated performance indicators.

More particularly, in the analysis unit 203, a packet error calculator may calculate a packet error rate (PER) of the V2X communication system, and a location calculator may calculate a distance between vehicles.

An image generator of the analysis unit 203 constructs a map image for displaying a moving path of a vehicle over time, and a graph image for displaying performance indicators such as received signal strength indicator (RSSI), packet transmission rate and packet error rate (PER) of the V2X communication system which are changed over time.

The map image and the graph image constructed as described above may be displayed on a screen through a display module (not shown) provided or connected to the client 130.

If an Analysis menu is selected in the analysis system 100 to analyze a performance indicator of the V2X communication system and then a TEST ID to be analyzed is selected, a user interface (UI) may be displayed on a screen of the client 130, as shown in FIG. 24.

Figure 25:
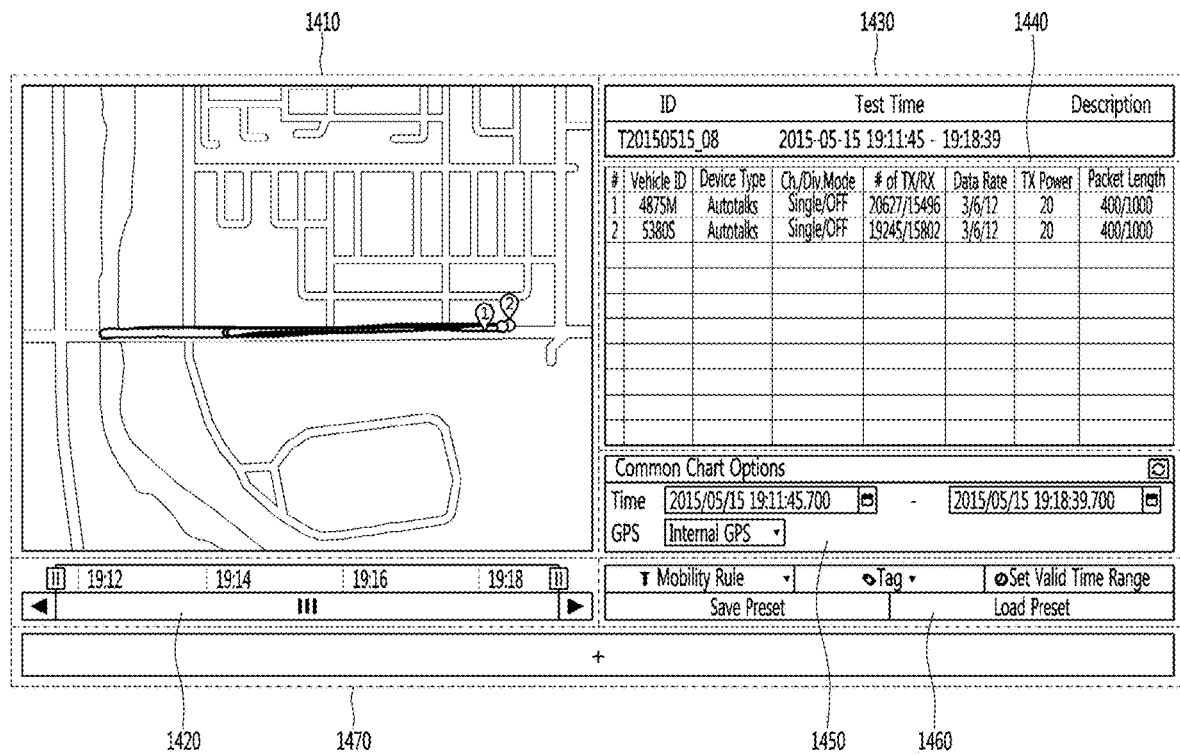
FIG. 25 is a view illustrating an embodiment of the user interface (UI) provided for analyzing communication performance of the V2X communication system.

Referring to FIG. 25, a communication performance analysis screen may comprise the map region 1410, the time setting region 1420, the test information region 1430, the vehicle information region 1440, the common setting region 1450, the additional setting region 1460, and the graph addition region 1470.

A map image indicating the location of each vehicle at the present time along with the moving path of vehicles participating in the test may be displayed on the map region 1410.

The map image is automatically scrolled to display the moving path and the current location of all vehicles, and its zoom ratio may be changed. Also, it may be automatically changed according to a time range which is set in the time setting region 1420 or the common setting region 1450.

In the time setting region 1420, a user interface (UI) may be provided to allow the user to specify a start time point and an end time point of analysis for setting ROI in the time domain.

Figure 26:
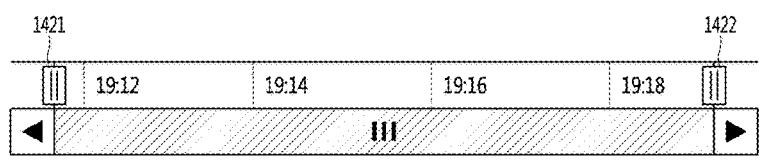
FIGS. 26 and 27 are view illustrating the first embodiment of a method of setting the region of interest (ROI) in a time domain.

Referring to FIG. 26, the buttons 1421 and 1422 corresponding to analysis start time points and end time points and which may be moved to the left and right may be displayed on a time bar representing a time range of the entire test.

Figure 27:
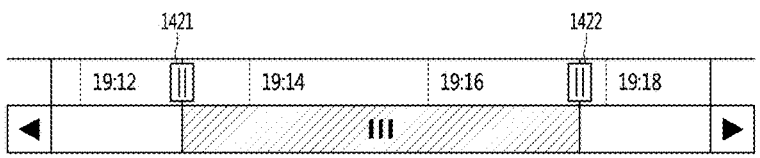

As shown in FIG. 27, the user may move the start time button 1421 and the end time button 1422, respectively, to set a time range to be analyzed.

When the time range is set in the time setting region 1420 as described above, the map image displayed on the map region 1410 and the vehicle information displayed on the vehicle information region 1440 may be automatically changed in accordance with the set time range.

In the test information region 1430, a test ID and test execution time information for identifying a test to be analyzed may be displayed, and a brief description of the test may be displayed.

The vehicle information region 1440 may display information on vehicles participating in the test, and the displayed vehicle information may include a vehicle ID, a V2X communication system type, a channel mode (Ch./Div. Mode), the number of packets transmitted/received (# of TX/RX), a data rate used during the test, TX power and a packet length, as shown in Table 2 below.

TABLE 2

| # | Vehicle ID | Device Type | Ch./DIV. Mode | # of TX/RX | Data Rate | TX Power | Packet Length |
|---|---|---|---|---|---|---|---|
| 1 | 4875M | A | Single/OFF | 20627/15496 | 3/6/12 | 20 | 400/1000 |
| 2 | 5380S | B | Single/OFF | 19245/15802 | 3/6/12 | 20 | 400/1000 |

The common setting region 1450 may be provided with a user interface (UI) for setting options to be used for generating a graph representing the analysis result.

Figure 28:
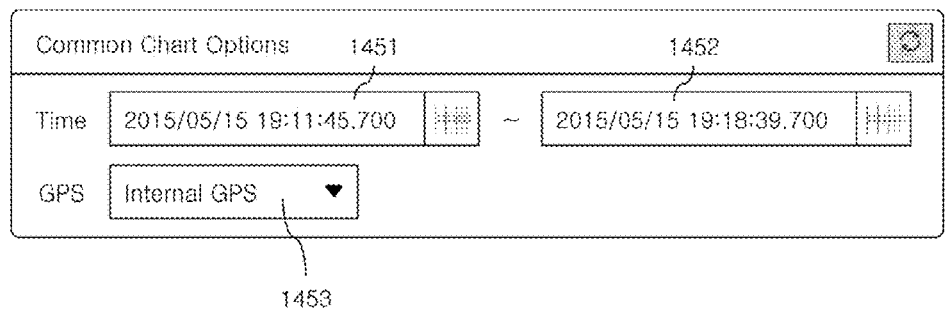
FIG. 28 is a view illustrating the second embodiment of a method of setting the region of interest in a time domain.

Referring to FIG. 28, the user may input an analysis start time point and an end time point directly by using the time input boxes 1451 and 1452 displayed in the common setting region 1450 to set the region of interest.

Also, the user may select one of an internal GPS and an external GPS by using the GPS setting box 1453, and press a refresh button to reflect the changed time range or the GPS setting. In the additional setting region 1460, a user interface (UI) for setting or managing data extraction rules, tags, and valid time ranges, or storing or applying graph-related presets may be provided.

Figure 29:
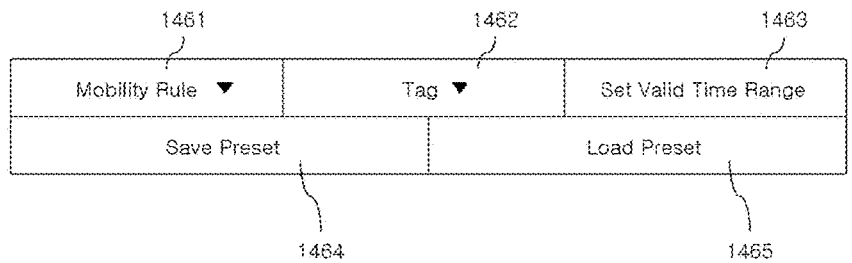
FIG. 29 is a view illustrating an embodiment of the user interface (UI) provided for additional function setting.

Referring to FIG. 29, the user selects the Mobility Rule button 1461 in the additional setting region 1460, to generate, apply, or edit/delete a data extraction rule (Rule).

Figure 30:
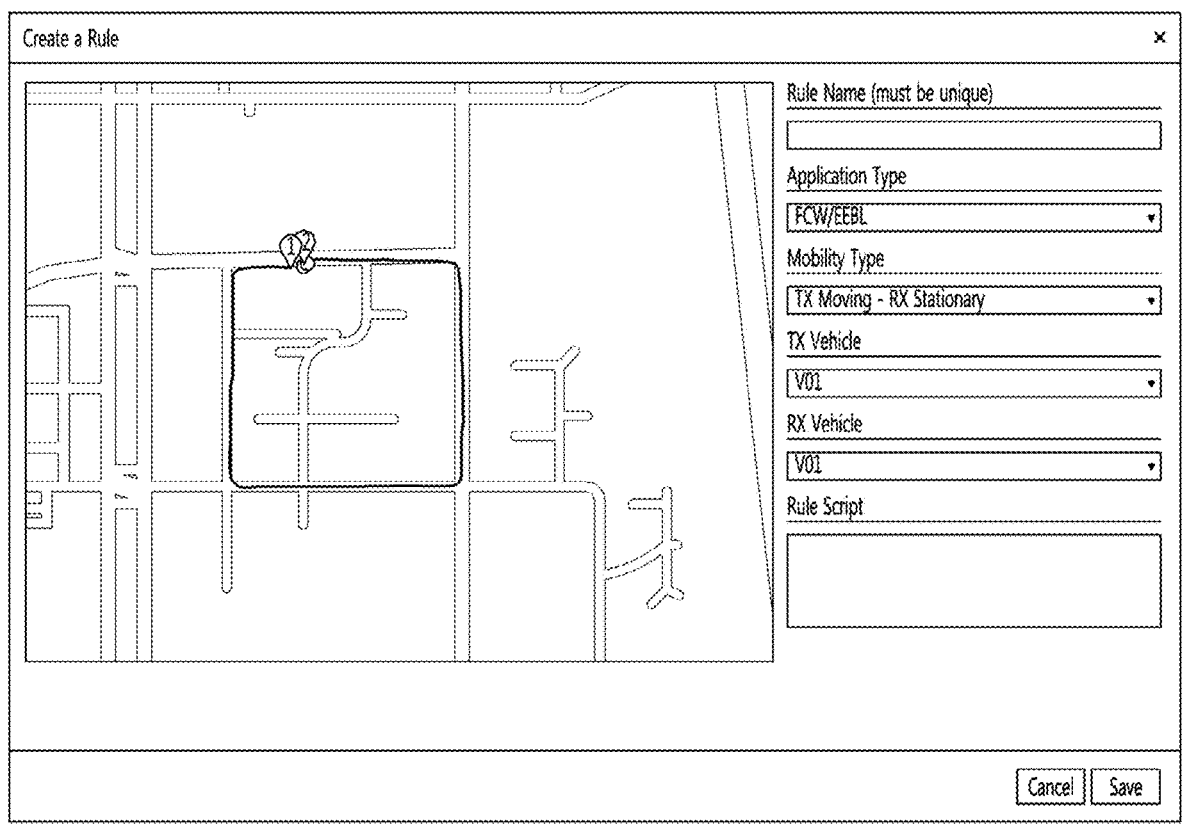
FIG. 30 is a view illustrating an embodiment of a method of setting the region of interest on the basis of performance indicators.

For example, if the user selects the Mobility Rule Generation to set the region of interest, a user interface (UI) for setting a data extraction rule may be provided as shown in FIG. 30.

Referring to FIG. 30, the data extraction rule (Rule) may include a rule identification name (Rule Name), an application type, a mobility type, TX vehicle information, RX vehicle information RX and a script (Rule Script) for setting the region of interest.

Herein, the identification name is a rule name (Rule Name) for identifying the corresponding rule; the application type and the mobility type are to classify the type of tags to be generated as a result of the Rule; and the TX vehicle information indicates a vehicle to transmit a radio signal, and the RX vehicle information indicates a vehicle to receive a radio signal. The script is a data extraction rule (Rule) which is written with a combination of commands according to a predetermined grammar.

Since a condition for a performance indicator (e.g., a motion or signal characteristic of a vehicle) related to at least one of a signal transmitting vehicle and a signal receiving vehicle can be defined using the script, the analysis result can be visualized based on a performance indicator that the user considers important.

As described above, performance indicators that may be used as a predefined constant (reservation constant) in the script for defining a data extraction rule may be those as shown in Table 3 below.

TABLE 3

| Constant Names | Descriptions |
|---|---|
| $src.vid | Vehicle ID of a vehicle which transmits a packet |
| $src.gps | GPS information of a vehicle which transmits a packet |
| $src.gps.lat | Latitude information of a transmitting vehicle |
| $src.gps.lng | Longitude information of a transmitting vehicle |
| $src.gps.alt | Altitude information of a transmitting vehicle |
| $src.gps.spd | Speed of a transmitting vehicle, km/h |
| $src.gps.direction | Driving direction of a transmitting vehicle |
| $src.gps.time | Time of a transmitting vehicle |
| $dst.vid | Vehicle which receives a packet |
| $dst.gps | GPS information of a vehicle which receives a packet |
| $dst.gps.lat | Latitude information of a receiving vehicle |
| $dst.gps.lng | Longitude information of a receiving vehicle |
| $dst.gps.alt | Altitude information of a receiving vehicle |
| $dst.gps.spd | Speed of a receiving vehicle, km/h |
| $dst.gps.direction | Driving direction of a receiving vehicle |
| $dst.gps.time | Time of a receiving vehicle |
| $tx_power | TX power that a transmitting vehicle transmits a packet, dBm |
| data_rate | Data rate that a receiving vehicle receives a packet, Mbps |
| $rssi | Received signal strength indicator (RSSI), dBm |
| $rtt | Round-trip time of a packet, Msec |
| $pkt_len | Total length of a transmitted packet, Byte |
| $dist | Distance between a transmitting vehicle and a receiving vehicle, m |
| $angle | Angle between a TX vehicle driving direction and a RX vehicle driving direction, logistic method |
| $rel_vel | Relative speed between a TX vehicle and a RX vehicle |

Referring to Table 3, in relation to the TX vehicle, the constants used in the script may include TX vehicle identifier ($src.vid), TX vehicle GPS information ($src.gps), TX vehicle latitude information ($src.gps.lat), TX vehicle longitude information ($src.gps.lng), TX vehicle altitude information ($src.gps.alt), TX vehicle speed ($src.gps.spd), TX vehicle driving direction ($src. gps.direction) and TX vehicle time ($src.gps.time).

In relation to the RX vehicle, the constants used in the script may include RX vehicle identifier ($dst.vid), RX vehicle GPS information ($dst.gps), RX vehicle latitude information ($dst.gps.lat), RX vehicle longitude information ($dst.gps.lng), RX vehicle altitude information ($dst.gps.alt), RX vehicle speed ($dst.gps.spd), RX vehicle driving direction ($dst. gps.direction) and RX vehicle time ($dst.gps.time).

In relation to the signal characteristic, the constant used in the script may include transmission strength ($tx_power) that the TX vehicle (more particularly, the V2X communication system provided in the TX vehicle) transmits a signal, data transmission rate (data_rate) that the TX vehicle transmits a packet, signal strength ($rssi) that the RX vehicle (more particularly, the V2X communication system provided in the RX vehicle) receives a packet, packet round trip time ($rtt), and transmitted packet total length ($pkt_len).

In relation to the motion characteristics between the signal transmitting and receiving vehicles, the constants used in the script may include a distance ($dist) between the TX vehicle and the RX vehicle, an angle between the RX vehicle driving direction and the RX vehicle driving direction ($angle), and a relative speed ($rel_vel) between the TX vehicle and the RX vehicle.

The user may construct a command using the constants and various kinds of operators as described above and write a conditional statement using a combination of the commands, to generate the script for defining a data extraction rule.

The following script is to explain an example of how to define a data extraction rule, in which data on a section that a distance between the TX vehicle and the RX vehicle is 300 m or less and the RX vehicle is moving at a speed faster than 10 km/s is extracted as the ROI data.

$plot=($dist<=300)
&& ($dst.gps.spd>10);

In the analysis start step, when the user selects a test ID (TEST) for analysis, data extraction rules (Rule) applicable to the corresponding test may be displayed as shown in FIG. 31. The displayed data extraction rules may be rules generated by the user in a manner as described with reference to FIG. 30 or rules predefined in the system.

If the user selects any one of the data extraction rules applicable to the test, a tag generated as a result of applying the rule may be distinguishably displayed in the time setting region 1420, and the corresponding time range may be selected by selecting a specific tag in the time setting region 1420.

The tag, which indicates at least one time range corresponding to the ROI, may be automatically generated by applying the data extraction rule, or may be generated by setting the time range by the user.

Alternatively, when the user sets ROI in the spatial domain, the tag may be automatically generated as the time range corresponding to the spatial domain.

The user may press the tag button 1462 and click Select in the user interface (UI) as shown in FIG. 29, to display a time range designated as a specific tag in the time setting region 1420 and reflect it on a graph showing the analysis result.

If the user presses the tag button 1462 and then click Manage in the user interface (UI) as shown in FIG. 29, a user interface (UI) may be provided to allow for identification of information on multiple tags, deletion and edition, as shown in FIG. 32.

In another embodiment of the present invention, by using the tag as described above, sections having the same tag among the results of the plurality of tests may be integrally analyzed.

The user may select the Set Valid Time Range button 1463 in the user interface (UI) as shown in FIG. 29, to set to analyze data excluding a specific time range.

The valid time range set as described above is applied in preference to the tag, and if the tag includes a time out of the valid time range, the time may be excluded from the analysis.

Meanwhile, when the valid time range is designated, it may be displayed using colors to avoid setting a time out of the valid time range.

Also, the user may select the Save Preset button 1464 to save a newly added graph, which may be reproduced in later analysis or used to reproduce the same or similar graph in another test.

Also, the user may select the Load Preset button 1465 to read the stored preset and apply it to the current test. In this case, the target time, whether the Tx/Rx region is set, whether the script is applied, and the vehicle ID can be redefined.

Referring back to FIG. 25, in the graph addition region 1470 at the bottom, a user interface (UI) may be provided to add a new graph in a region below the current screen.

Figure 33:
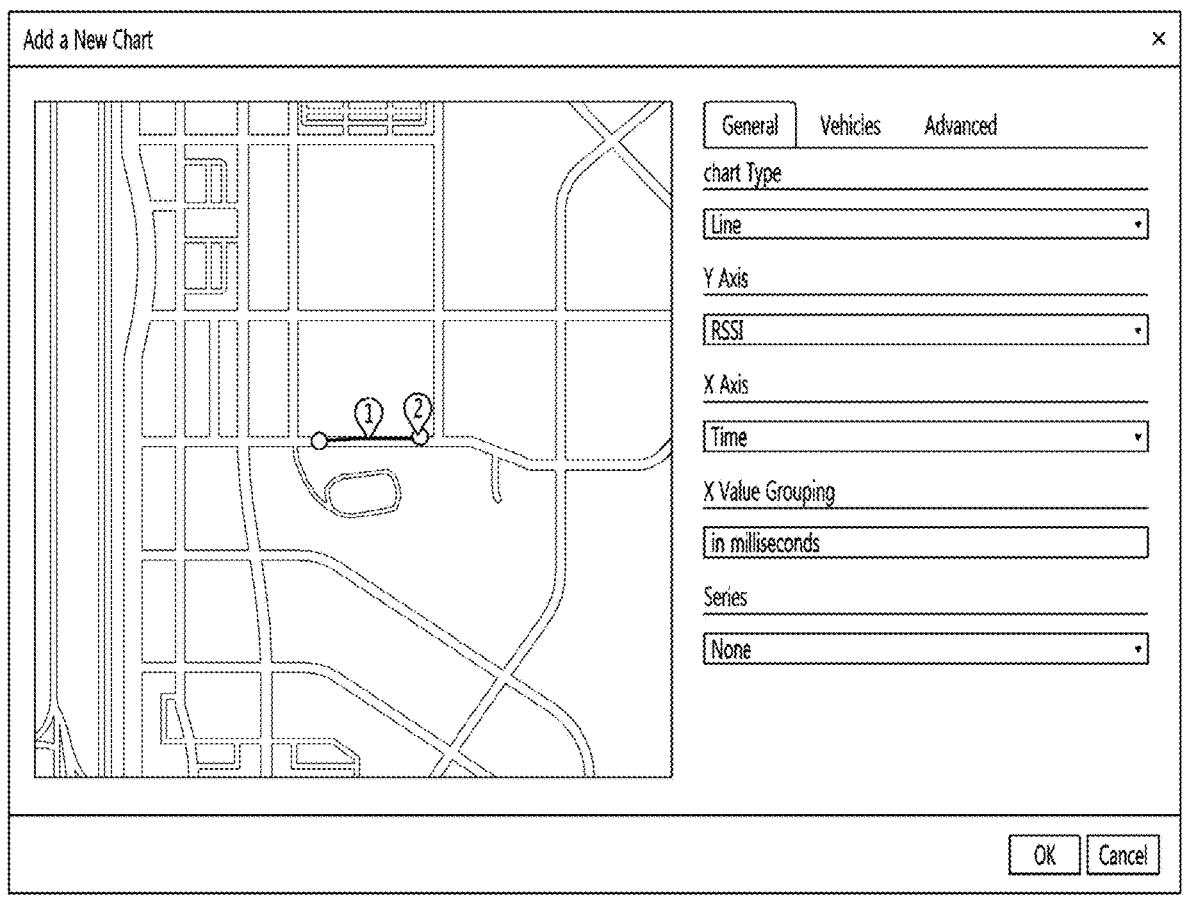
FIG. 33 is a view illustrating an embodiment of the user interface (UI) provided for adding a graph.

Referring to FIG. 33, the user may select Graph Type, Performance Indicator to be displayed on the Y-axis, Performance Indicator to be displayed on the X-axis, X Value Grouping and Series to add a new graph.

For example, the graph type may be selected from the types shown in FIG. 23; the performance indicator (Y Axis) to be displayed on the Y-axis may be selected from those shown in FIG. 35; and the performance indicator (X Axis) to be displayed on the X-axis may be selected from those shown in FIG. 36.

The X Value Grouping is the function of classifying the analyzed data into specific value section again when using the X-axis/series/Z-axis having consecutive values.

For example, if the distance is selected as the X-axis, when there is no grouping, all distance values are used as the X-axis value. When the grouping is set to 10 m, values of 10 m units such as 0 m~10 m/10 m~20 m/ . . . are grouped into the same X-axis value, and a Y-axis value may be an average of the corresponding X-axis values.

However, when discrete values such as TX power, data rate, or packet length are used as the X-axis/series/Z-axis, the grouping of the values cannot be used, and the corresponding interface may disappear from the screen.

When the Vehicles tab is selected in the UI of FIG. 33, as shown in FIG. 37, a UI for selecting a vehicle to be analyzed for communication performance may be provided.

Thus, the relationships between individual transmission/ reception vehicle, all transmission vehicles and individual reception vehicle, individual transmission vehicle and all reception vehicles, all transmission vehicles and all reception vehicles may be analyzed.

Also, the user may select the Advance tab in the UI of FIG. 33 to construct more detailed settings of the graph.

Although the present invention has been described by a way of example wherein a 2D graph is constructed, a Z-axis may be added to generate a 3D graph.

As described above, the user may set the region of interest by designating a region on a map image indicating a moving path of transmission/reception vehicles.

Hereinafter, particular embodiments of a method of setting the region of interest in a space domain will be described with reference to FIGS. 38 to 40.

On the top of a map image of a UI screen for adding a graph as shown in FIG. 33, the plurality of icons 2601, 2602, 2603, and 2604 as shown in FIG. 38 may be displayed.

Referring to FIG. 38, the first icon 2601 is for moving a map, the second icon 2602 is for setting the region of interest using a circle, and the third icon 2603 is for setting the ROI using a rectangle, and the fourth icon 2604 is for setting the ROI using a polygon.

The user may move the map to the ROI to be analyzed, select a shape that fits the ROI among a circle, a rectangle, and a polygon, place the selected shape on the ROI, and adjust its size to adjust the ROI over the space domain.

Referring to FIG. 39, the user may designate the region of interest thus selected as the transmission region (RX region) or the reception region (TX region), and then release the selected region of interest.

The region of interest initially displayed on the map is displayed in a first color (e.g., gray) as shown in FIG. 39, and may be changed when the region is set as a transmission region or a reception region.

Referring to FIG. 40, the region set as the transmission area may be displayed using a second color (e.g., red), the region set as the reception region may be displayed using a third color (e.g., blue), and the regions set as the transmission and reception regions may be displayed using a fourth color (e.g., green).

Figure 41:
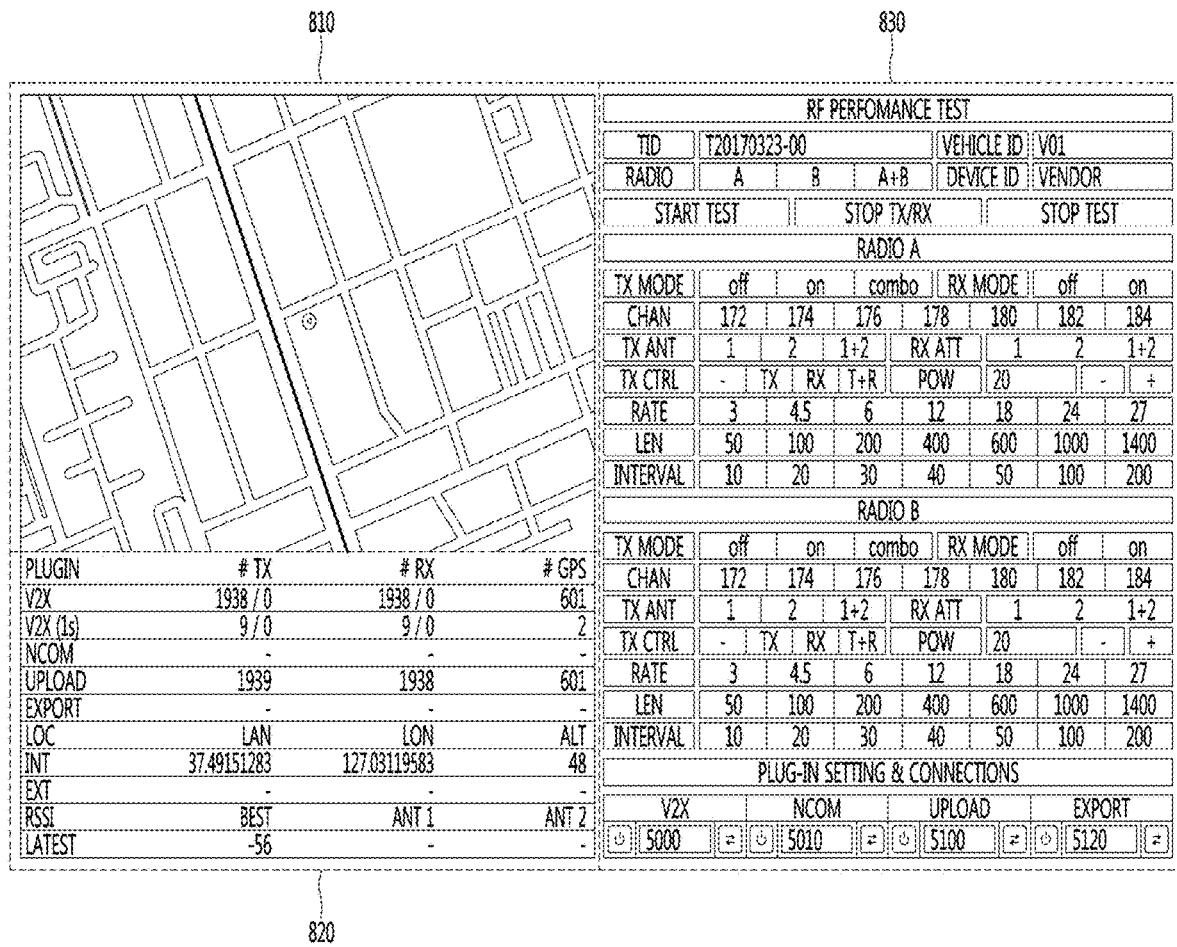
FIGS. 41 and 42 are view illustrating other embodiments of the user interface (UI) provided from the data collector.
Figure 42:
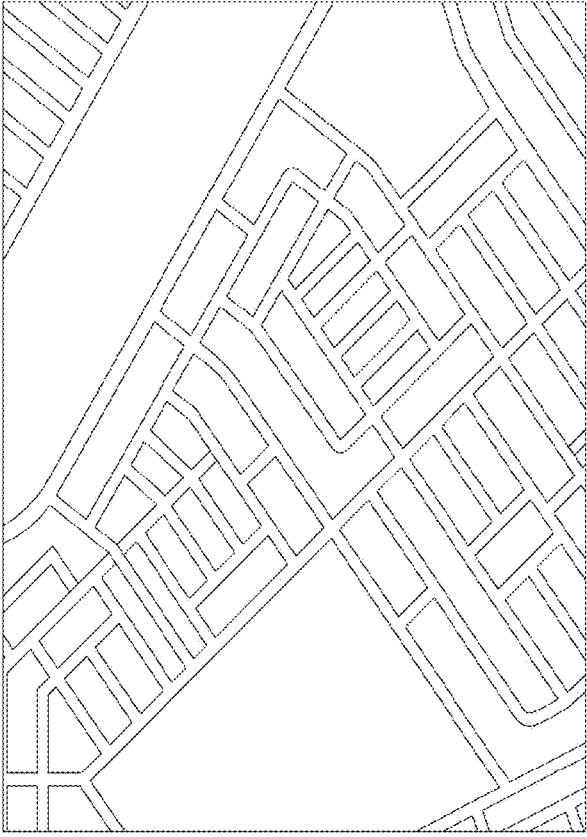

FIGS. 41 and 42 are diagrams illustrating other embodiments of the user interface (UI) provided from the data collector. The method of collecting radio signal data from the V2X communication system 10 by the data collector 110 will be again described with reference to FIGS. 41 and 42.

Referring to FIG. 8, the data collector 110 may transmit a "PKT_SETUP" packet to the V2X communication system 10 to set a parameter for testing the V2X communication system 10.

To this end, the data collector 110 may first acquire a communication parameter for performing the test which is set through a user interface (UI) provided as in the screen shown in FIG. 41. Here, the screen shown in FIG. 41 may be displayed on the client 130 or may be displayed on the data collector 110 when the display module is provided in the data collector 110.

Specifically, the "Logger UI" provided from the data collector 110 may comprise a first region 810 for displaying information on a location where the test is performed on the map, a second region 820 for indicating a V2X/GPS packet, location information (latitude, longitude, altitude) and a received signal strength indicator (RSSI) collected from the V2X communication system 10, and a third region 830 for setting parameters to perform the performance test of a radio signal and confirming the connection and the state of each plug-in.

A test ID (TID) for identifying a test, a vehicle ID (VEHICLE ID) for identifying a vehicle, and a device ID (DEVICE ID) for identifying a V2X communication system to be tested may be provided through the third area 830, and a radio signal for the test may be selected.

Also, according to each radio signal (RADIO A, RADIO B), the user may activate transmission/reception modes (TX MODE, RX MODE); set a channel (CHAN); set transmission/reception antennas (TX ANT, RX ANT); set a TX/RX control (TX CTRL); or set a transmission rate (RATE), a length (LEN) and an interval (INTERVAL) of a packet.

In a lower portion of the third region 830, the connection to the outside through the input/output plug-ins of the data collector 110 as described above may be set and controlled, respectively, and the connection and information transmission state of each plug-in may be confirmed.

The "PKT_SETUP" packet transmitted from the data collector 110 to the V2X communication system 10 may be transferred to the V2X communication system 10 together with the "VPCONF" packet including parameters set in the third region 830 of "Logger UI", as described with reference to FIG. 41.

Thereafter, the data collector 110 transmits the "PKT_STAT" packet to the V2X communication system 10 to request confirmation of the operation state (normal operation or not) of the V2X communication system 10. The V2X communication system 10 may transmit the packet (VPSTAT) including information on its operating state (normal operation or not) to the data collector 110.

The operation state confirmation request from the data collector 110 to the V2X communication system 10 and the operation state information response from the V2X communication system 10 to the data collector 110 may be periodically performed.

Then, when the data collector 110 transmits the "PKT_START" packet to the V2X communication system 10 to notify the start of data collection, packet data (PKT_TX, PKT_RX) and GPS packet data transmitted and received by the V2X communication system 10 are transmitted to the data collector 110 to start data collection.

When the data collector 110 transmits the "PKT_STOP" packet to the V2X communication system 10 to notify the end of data collection, the data transmission from the V2X communication system 10 to the data collector 110 may be terminated.

In addition, as in the "Logger UI" shown in FIG. 42, the V2X communication system 10 may be operated according to a predefined operation method without setting parameters. In this case, the V2X communication system 10 may transfer packet data for each layer to the data collector 110 without receiving commands of "PKT_SETUP", "PKT_START", and "PKT_STOP".

In another embodiment of the present invention, vehicle communication messages transmitted and received between vehicles and application result values determined based on these messages may be displayed in correspondence with each other over time, so that application-related tests performed in the V2X communication system can be easily performed.

Herein, an event to be analyzed may include a communication message transmitted and received between vehicle as described above, and an application result value determined according to the communication message between vehicles.

Hereinafter, particular embodiments of a method and a system for analyzing an event of the V2X communication system according to the present invention will be described in detail with reference to FIGS. 43 to 46.

Figure 43:
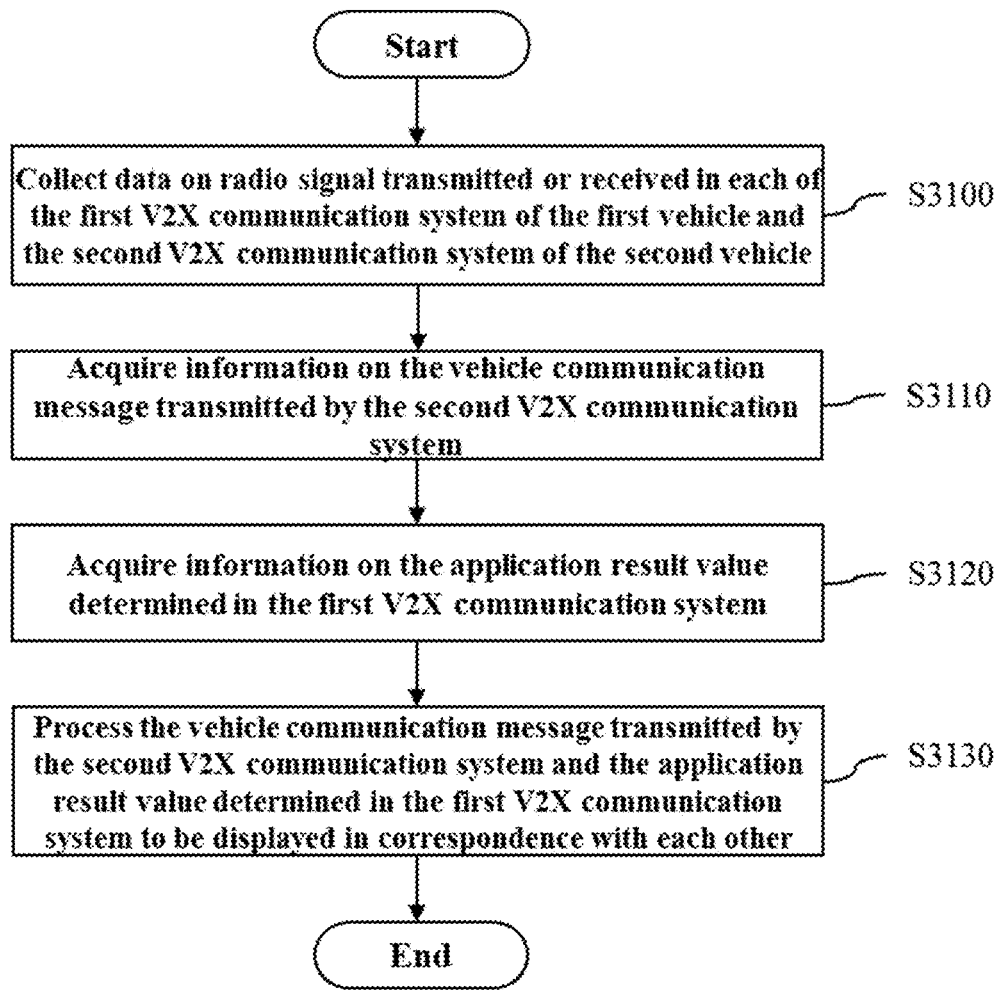
FIG. 43 is a flowchart illustrating a method of analyzing an event of the V2X communication system according to an embodiment of the present invention.

FIG. 43 is a flowchart illustrating a method of analyzing an event of the V2X communication system according to an embodiment of the present invention, wherein radio signal data collected by the data collector 110 of the analysis system 100 is transferred to the client 130 through the server 120 to analyze the event of the V2X communication system.

Referring to FIG. 43, the client 130 collects data on radio signals transmitted or received in each of a first V2X communication system provided in a first vehicle and a second V2X communication system provided in a second vehicle, respectively (step S3100).

Herein, the first vehicle may be a host vehicle (HV), the second vehicle may be a remote vehicle (RV) around the host vehicle (HV), and the remote vehicle (RV) may be two or more vehicles.

In order to collect data in the step S3100, the server 120 may retrieve data corresponding to the test ID selected by the user from the database and transfer the data to the client 130. The client 130 may receive vehicle positioning data synchronized using a system time stamp with the radio signal data of the V2X communication system, from the server 120.

As a method of acquiring the radio signal data of the V2X communication system and the vehicle positioning data provided in a plurality of vehicles by the client 130 in the step S3100, the positioning data and the radio signal data may be collected from the positioning system and the V2X communication system provided in each vehicle by the data collector 110, the collected data may be transferred to the client 130 through the server 120, as described with reference to FIGS. 1 to 11. The data collector 110 may collect the radio signal data from a plurality of layers constructing the V2X communication system.

Then, the client 130 acquires information on the vehicle communication message transmitted by the second V2X communication system using the radio signal data collected in the step S3100 (step S3110), and information on the application result value determined in the first V2X communication system based on the vehicle communication message transmitted by the second V2X communication system (step S3120).

For example, the information on the vehicle communication message obtained in the step S3110 may be information collected from the second V2X communication system provided in the second vehicle, and may include basic safety message (BSM) data indicating time, position, speed, direction, brake system state, vehicle size, and the like.

The client 130 is further configured to use the radio signal data collected from the first V2X communication system provided in the first vehicle to determine whether the first V2X communication system receives a vehicle communication message transmitted by the second V2X communication system provided in the second vehicle.

The information on the application result value obtained in the step S3120 may be information collected from the first V2X communication system provided in the first vehicle, and may include Forward Crashing Warning (FCW), Emergency Electronic Brake Lights (EEBL), Blind Spot Warning (BSW), Lane Change Warning (LCW), Intersection Movement Assist (IMA), and the like.

According to the obtained information, the client 130 processes the vehicle communication message transmitted by the second V2X communication system and the application result value determined in the first V2X communication system to be displayed in correspondence with each other (step S3130).

For example, the client 130 may display changes in the application result value and the vehicle communication message over time in synchronization with each other.

Figure 44:
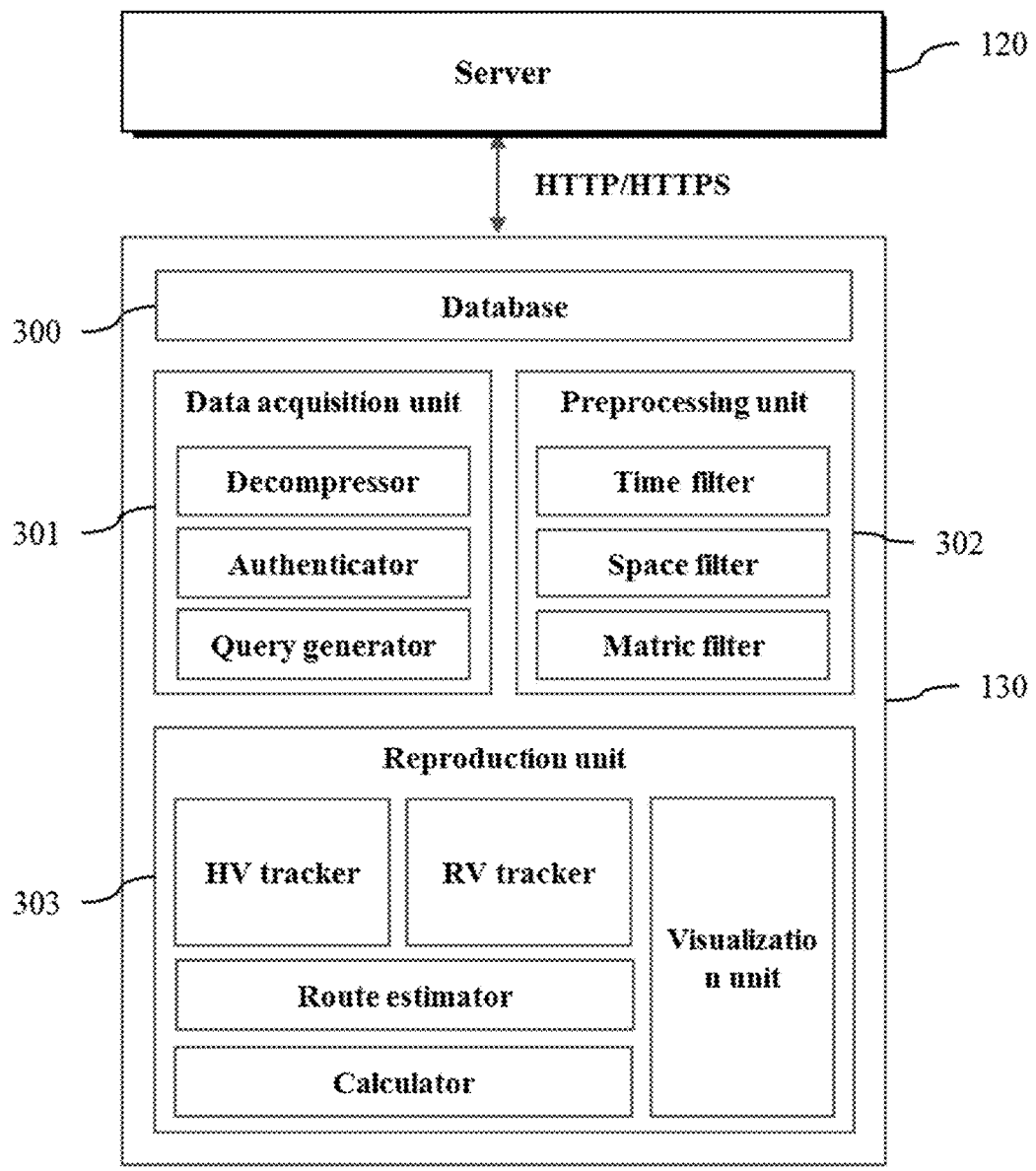
FIG. 44 is a block diagram illustrating another embodiment of the client configuration.

FIG. 44 is a block diagram illustrating an embodiment of the client configuration. The client 130 may comprise the database 300, the data acquisition unit 301, the preprocessing unit 302, and the reproduction unit 303. The same descriptions as those described with reference to FIGS. 1 to 12 in relation to the operations of the client 130 as shown in FIG. 44 will be omitted in the following description.

Referring to FIG. 44, the data, which is received from the server 120 through the data acquisition unit 301 of the client 130, may be stored in the database 300.

To this end, the data acquisition unit 301 may comprise a decompressor for selectively decompressing data received from the server 120, an authenticator for performing user authentication, and a query generator for inquiry data using a test ID.

The preprocessing unit 302 applies filtering such as a time filter, a space filter, and a metric filter to data received from the server 120 through the data acquisition unit 301, thereby extracting data on the region of interest to be analyzed.

For example, when the region of interest is determined in a time domain, the time filter is applied to data received from the server 120 to extract data corresponding to a specific time range, and when the region of interest is determined in a spatial domain, the space filter may be applied to data received from the server 120 to extract data corresponding to a specific location area.

Also, when the region of interest is determined based on a performance indicator indicating a motion characteristic or a signal characteristic of a signal transmitting/receiving vehicle, the metric filter is applied to data received from the server 120 to extract data corresponding to a specific performance condition.

A HV tracker of the reproduction unit 303 may acquire radio signal data and the corresponding logic data for the first vehicle, which is the host vehicle (HV), to construct a moving path of the second vehicle.

A RV tracker may acquire radio signal data and the corresponding logic data for the second vehicle, which is the remote vehicle (RV), to construct a moving path of the second vehicle.

A route estimator is configured to use the basic safety message (BSM) data received from the V2X communication system of the second vehicle, which is the remote vehicle (RV), by the V2X communication system of the first vehicle, which is the host vehicle (HV), to construct a moving path of the second vehicle.

The visualization unit functions to process the changes of the application result value and the vehicle communication message over time to be displayed in synchronization with each other.

The changes of the application result value and the vehicle communication message processed as described above may be displayed on a screen through a display module (not shown) provided or connected to the client 130.

Figure 45:
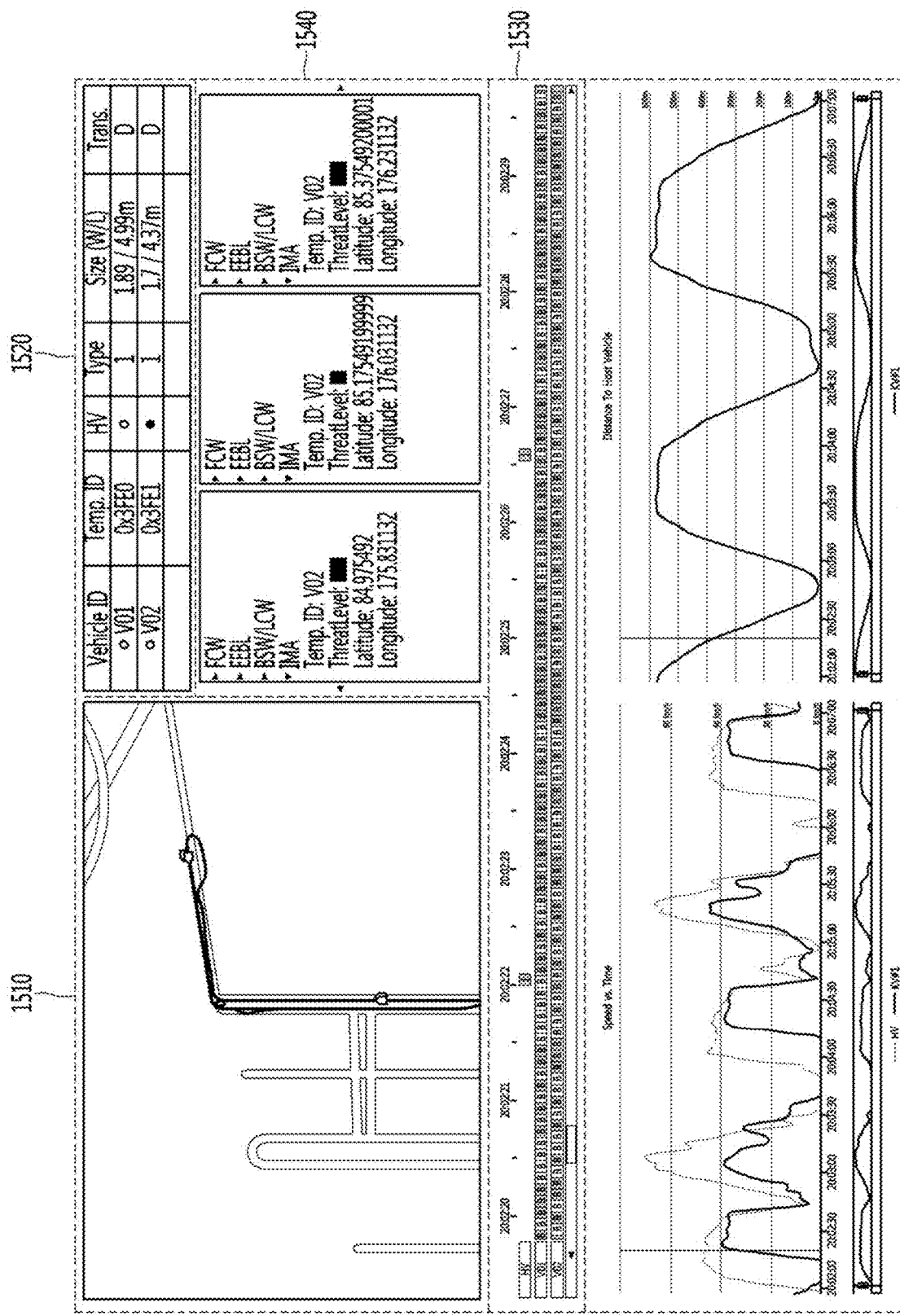
FIG. 45 is a view illustrating an embodiment of the user interface (UI) provided for analyzing an event of the V2X communication system.

If an Event Analysis menu is selected in the analysis system 100 to analyze an event of the V2X communication system and then a TEST ID to be analyzed is selected, a user interface (UI) may be displayed on a screen of the client 130, as shown in FIG. 45.

Referring to FIG. 45, an event analysis screen may comprise the map region 1510, the vehicle information region 1520, the event display region 1530, the detail information region 1540, and the graph display region 1550.

A map image indicating the location of each vehicle at the present time along with the moving path of vehicles participating in the test may be displayed on the map region 1510.

The map image is automatically scrolled to display the moving path and the current location of all vehicles, and its zoom ratio may be changed.

Information on vehicles participating in the test may be displayed on the vehicle information region 1520, and one of the vehicles (V01 and V02) may be set as the host vehicle (HV).

In the event display region 1530, vehicle communication messages transmitted by each of the vehicles (V01 and V02) are continuously displayed over time. The event display region 1530 may also display an application result value determined based on a vehicle communication message received from the remote vehicle (RV) by a vehicle (e.g., V02) set as the host vehicle (HV).

When the user selects a particular application result value displayed on the event display region 1530, information on logic data used to determine the application result value may be displayed on the detail information region 1540.

The logic data is calculated using a vehicle communication message received from the remote vehicle (RV), and may include target classification (TC), time-to-collision (TTC), time-to-intersection (TTI), and distance to intersection (DTI).

In the graph display region 1550, a graph image indicating a change in speed for each of the vehicles (V01 and V02) and a distance from the host vehicle (HV) to the remote vehicle (RV) is displayed. However, the graph display region 1550 may display a graph image indicating a change in communication performance over time, including a packet transmission rate (PDR), a received signal strength indicator (RSSI), and a GPS error in each vehicle.

Figure 46:
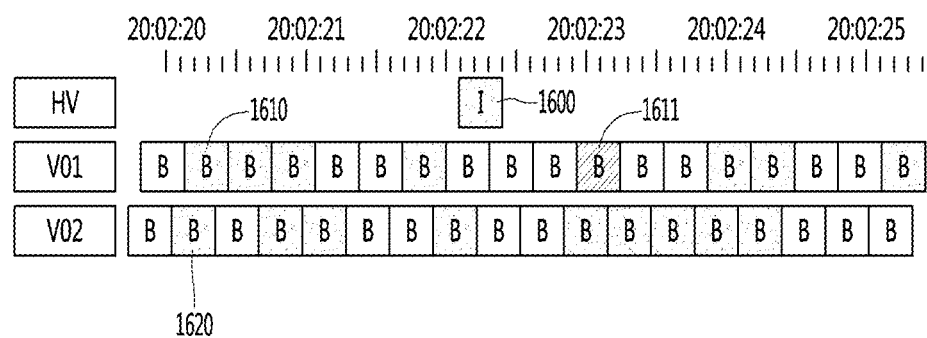
FIG. 46 is a view illustrating an embodiment of a method of displaying the application result value and the vehicle communication message in correspondence with each other.

FIG. 46 is a view illustrating an embodiment of a method of displaying the application result value and the vehicle communication message in correspondence with each other, and a change of the application result value and the vehicle communication message over time is synchronized with each other and displayed in the event display region 1330.

Referring to FIG. 46, the application result value 1400 determined by the host vehicle (HV) may be displayed at a position corresponding to that time point.

The vehicle communication messages 1610 and 1620 transmitted by each of the vehicles (V01 and V02) participating in the test may be sequentially displayed from left to right as time passes.

The application result value of the host vehicle (HV) may be determined based on the vehicle communication message 1610 transmitted by the remote vehicle (RV) before that time point.

Some of vehicle communication messages transmitted by the remote vehicle (RV) may not be received by the host vehicle (HV), and the vehicle communication message not received may be displayed to be distinguished from the normally received vehicle communication message by colors.

In an example shown in FIG. 46, it can be seen that the vehicle communication message 1621 sent by the remote vehicle (RV) around 20:02:24 has not been received by the host vehicle (HV).

While the event analysis result for the V2X communication system is reproduced, as shown in FIG. 46, application result values and vehicle communication messages in the form of blocks move from left to right over time, and the new application result value and vehicle communication message are displayed on the rightmost side.

Although the present invention has been described by a way of example in which the method and system for analyzing a vehicle-to-object communication system according to the present invention is performed based on the North America Vehicle Communication Standard (WAVE), the present invention is not limited thereto.

For example, the method and system for analyzing a vehicle-to-object communication system according to the present invention may be applied to various vehicle communication standards in Europe or Japan.

The methods according to the embodiments of the present invention may be realized as a program which may be executed on a computer and may be stored in a computer-readable recording medium. Examples of the computer-readable recording medium include ROM, RAM, CD-ROM, magnetic tapes, floppy disks, optical data storage devices, and the like, and also include those implemented in the form of carrier waves (e.g., transmission over the Internet).

The computer readable recording medium can be distributed over computer systems connected by a network so that computer readable codes are stored and executed in a distributed fashion. Functional programs, codes, and code segments for implementing the aforementioned methods can be easily inferred by programmers in the art to which the present invention belongs.

As such, it is to be understood that the technical configuration of the present invention as described above can be implemented by those skilled in the art as other specific forms without changing the technical spirit or essential features of the present invention.

Therefore, it is to be understood that the embodiments as described above are only exemplary and not restrictive in all respects, and the scope of the present invention is indicated by the appended claims rather than the foregoing detailed description. Further, all variations or modifications derived from the meaning and the scope of the appended claims and their equivalents should be construed as being included in the scope of the present invention.

The invention claimed is:

1. An analysis method for testing a vehicle-to-object (V2X) communication system, the method comprising the steps of:
    collecting data on a radio signal from the V2X communication system, the radio signal being transmitted or received in the V2X communication system; and
    transferring at least a portion of the collected radio signal data to a client,
    wherein the radio signal data is collected from two or more layers constructing the V2X communication system, and
    wherein the transferring step comprises:
    acquiring data extraction rules transferred from the client which are selected by a user interface displayed on the client, wherein the data extraction rules are script with a combination of commands and predefined constants according to a predetermined grammar corresponding to the radio signal;
    preprocessing data on a region of interest (ROI) by applying one or more filters to the radio signal according to the data extraction rules, wherein the one or more filters comprises at least one of a time filter corresponding to a specific time range, a space filter corresponding to a spatial domain, and a metric filter of performance indicator indicating a motion characteristic or a signal characteristic of a signal transmitting and/or receiving vehicle; and
    analyzing the ROI data to synchronize vehicle communication messages transmitted or received between vehicles through the V2X communication system and application result values determined by the vehicle communication messages in correspondence with each other, and transferring an event analysis result to be reproduced in the user interface of the client, wherein the event analysis result comprises visualized changes in the application result values and the vehicle communication messages over time in synchronization with each other for the V2X communication system.

2. The analysis method according to claim 1, wherein the radio signal data collected from the V2X communication system comprises received signal information, the vehicle communication messages, logic data calculated using the vehicle communication messages, and the application result values determined using the logic data.

3. The analysis method according to claim 2, wherein the received signal information comprises a received signal strength indicator (RSSI) and a channel busy ratio (CBR).

4. The analysis method according to claim 2, wherein the vehicle communication messages comprise basic safety message (BSM) data which is received from one or more other V2X communication systems, and the basic safety message comprises at least one of a time, a location, a speed, a direction, a brake system status and a vehicle size.

5. The analysis method according to claim 2, wherein the logic data is calculated using vehicle communication messages which are received from one or more other V2X communication systems, and the logic data comprises at least one of target classification (TC), time-to-collision (TTC), time-to-intersection (TTI) and distance-to-intersection (DTI).

6. The analysis method according to claim 2, wherein the application result values comprise at least one of forward crashing warning (FCW), emergency electronic brake lights (EEBL), blind spot warning (BSW), lane change warning (LCW), and intersection movement assist (IMA).

7. The analysis method according to claim 1, further comprising the step of collecting location information of a vehicle, wherein the location information is synchronized with the collected radio signal data and is transferred to the client.

8. The analysis method according to claim 1, wherein the collecting comprises the steps of:
setting parameters for testing the V2X communication system;
confirming whether the V2X communication system is normally operated; and
receiving transmission packets or reception packets of the V2X communication system.

9. The analysis method according to claim 1, further comprising the steps of:
generating a radio signal used for testing the V2X communication system; and
transmitting the generated radio signal to the V2X communication system.

10. The analysis method according to claim 1, wherein the data on the ROI comprises at least one of an identification name, an application type, a mobility type, transmission vehicle information, reception vehicle information and a script for defining the ROI.

11. The analysis method according to claim 1, wherein the transferring comprises the steps of:
receiving information on a plurality of tests;
arranging the collected radio signal data, on which the plurality of tests are performed, as report data; and
transferring the arranged report data to the client.

12. The analysis method according to claim 1, wherein at least one of real-time tracking for a result of the testing being performed or performance analysis for a completed test result is processed using the radio signal data transferred to the client.

13. A non-transitory computer readable medium storing a computer program executed by a computer to perform the method according to claim 1.

14. An analysis system for testing a V2X communication system comprising:
a data collector processor connected to the V2X communication system and a positioning system, which are provided in a vehicle, through wired or wireless communication and configured to collect data on a radio signal transmitted or received in the V2X communication system and location information of the vehicle; and
a server configured to receive the radio signal data collected by the data collector processor, store it in a database, and transfer at least a portion of the received radio signal data to a client;
wherein the radio signal data is collected from two or more layers of layers constructing the V2X communication system, and
wherein the server is further configured to:
acquire data extraction rules transferred from the client which are selected by a user interface displayed on the client, wherein the data extraction rules are script with a combination of commands and predefined constants according to a predetermined grammar corresponding to the radio signal;
preprocess data on a region of interest (ROI) by applying one or more filters to the radio signal according to the data extraction rules, wherein the one or more filters comprises at least one of a time filter corresponding to a specific time range, a space filter corresponding to a spatial domain, and a metric filter of performance indicator indicating a motion characteristic or a signal characteristic of a signal transmitting and/or receiving vehicle; and
analyze the ROI data to synchronize vehicle communication messages transmitted or received between vehicles through the V2X communication system and application result values determined by the vehicle communication messages in correspondence with each other, and transfer an event analysis result to be reproduced in the user interface of the client, wherein the event analysis result comprises visualized changes in the application result values and the vehicle communication messages over time in synchronization with each other for the V2X communication system.

15. The analysis system according to claim 14, wherein the radio signal data collected from the V2X communication system comprises received signal information, the vehicle communication messages, logic data calculated using the vehicle communication messages, and the application result values determined using the logic data.

16. The analysis system according to claim 14, wherein the data collector processor comprises a V2X communication module configured to generate a radio signal used for testing the V2X communication system and transfer the generated radio signal to the V2X communication system.

17. The analysis system according to claim 14, wherein the server is further configured to receive information on a plurality of tests from the client, arrange data corresponding to the plurality of tests among the radio signal data stored in the database, and transfer the arranged data to the client.

* * * * *